(12) United States Patent
Chang et al.

(10) Patent No.: US 9,013,813 B2
(45) Date of Patent: Apr. 21, 2015

(54) OPTICAL IMAGING LENS SET AND ELECTRONIC DEVICE COMPRISING THE SAME

(71) Applicants: Kuo-Wen Chang, Taichung (TW); Sheng-Wei Hsu, Taichung (TW); Tzu-Chien Tang, Taichung (TW)

(72) Inventors: Kuo-Wen Chang, Taichung (TW); Sheng-Wei Hsu, Taichung (TW); Tzu-Chien Tang, Taichung (TW)

(73) Assignee: Genius Electronic Optical Co., Ltd., Central Taiwan Science Park, Daya District, Taichung (TW)

( * ) Notice: Subject to any disclaimer, the term of this patent is extended or adjusted under 35 U.S.C. 154(b) by 68 days.

(21) Appl. No.: 13/906,357

(22) Filed: May 31, 2013

(65) Prior Publication Data

US 2014/0184873 A1 Jul. 3, 2014

(30) Foreign Application Priority Data

Dec. 28, 2012 (TW) ............................. 101151012 A

(51) Int. Cl.
*G02B 3/02* (2006.01)
*G02B 9/08* (2006.01)
*G02B 9/60* (2006.01)
*G02B 13/00* (2006.01)
*G02B 13/04* (2006.01)
*G02B 9/00* (2006.01)
(Continued)

(52) U.S. Cl.
CPC ........ *G02B 13/0045* (2013.01); *G02B 13/0015* (2013.01); *G02B 13/001* (2013.01); *G02B 13/18* (2013.01); *G02B 3/04* (2013.01); *G02B 5/005* (2013.01); *G02B 3/02* (2013.01); *H04N 5/2254* (2013.01); *G02B 9/60* (2013.01); *G02B 13/04* (2013.01)

(58) Field of Classification Search
CPC ...... G02B 13/0045; G02B 9/60; G02B 13/18; G02B 13/0015; G02B 3/04; G02B 13/001; G02B 3/02; G02B 5/005; H04N 5/2254
USPC .......................... 359/714, 739, 740, 763, 764
See application file for complete search history.

(56) References Cited

U.S. PATENT DOCUMENTS 7,480,105 B2 1/2009 Mori
8,179,614 B1 5/2012 Tsai
(Continued)

FOREIGN PATENT DOCUMENTS

CN 201926811 U 8/2011
JP 2008281760 11/2008
(Continued)

*Primary Examiner* — Evelyn A Lester
(74) *Attorney, Agent, or Firm* — Winston Hsu; Scott Margo

(57) ABSTRACT

An optical imaging lens set includes: a first lens element with positive refractive power having an image-side surface with a convex part in a vicinity of a circular periphery of the first lens element, a second lens element having an object-side surface with a convex part in a vicinity of a circular periphery of the second lens element, a third lens element having an object-side surface with a concave part in a vicinity of a circular periphery of the third lens element, a fourth lens element having a concave object-side surface, and a plastic fifth lens element having an image-side surface with a concave part in a vicinity of the optical axis. The air gap between the second lens element and the third lens element $G_{23}$, and the air gap between the third lens element and the fourth lens element $G_{34}$, satisfied the relation $1.40 \leq G_{23}/G_{34}$.

18 Claims, 26 Drawing Sheets

(51) Int. Cl.
*G02B 13/18* (2006.01)
*G02B 3/04* (2006.01)
*G02B 5/00* (2006.01)
*H04N 5/225* (2006.01)

(56) References Cited

U.S. PATENT DOCUMENTS

| | | |
|---|---|---|
| 2010/0254029 A1 | 10/2010 | Shinohara |
| 2010/0265593 A1* | 10/2010 | Tang .................. 359/714 |
| 2011/0176049 A1 | 7/2011 | Hsieh |
| 2011/0249348 A1 | 10/2011 | Kubota |
| 2011/0316969 A1 | 12/2011 | Hsieh |
| 2012/0069455 A1 | 3/2012 | Lin |
| 2012/0087019 A1 | 4/2012 | Tang |
| 2012/0087020 A1 | 4/2012 | Tang |
| 2012/0162784 A1 | 6/2012 | Tang |
| 2012/0188655 A1 | 7/2012 | Tsai |
| 2012/0194920 A1 | 8/2012 | Huang |
| 2012/0218647 A1 | 8/2012 | Yonezawa |

FOREIGN PATENT DOCUMENTS

| | | |
|---|---|---|
| JP | 2010026434 | 2/2010 |
| JP | 2010152042 | 7/2010 |
| JP | 2010224521 | 10/2010 |
| JP | 4947235 | 6/2012 |
| TW | I268360 | 12/2006 |
| TW | M369459 | 11/2009 |
| TW | 201102690 | 1/2011 |
| TW | 201135304 | 10/2011 |
| TW | 201137430 | 11/2011 |
| TW | 201213926 | 4/2012 |
| TW | 201215942 | 4/2012 |
| TW | 201215943 | 4/2012 |
| TW | 201219884 | 5/2012 |
| TW | 201224571 | 6/2012 |
| TW | 201227044 | 7/2012 |
| TW | 201234068 | 8/2012 |
| TW | 201239444 | 10/2012 |

\* cited by examiner

| First Example | | | | | | |
|---|---|---|---|---|---|---|
| F=3.57 mm, HFOV= 35.86 deg. Fno=2.25 | | | | | | |
| No. | | Curvature Radius | Ape. Stop Distance Lens Thickness Air Gap | Refractive Index | Abbe No. | Focal Length | Material |
| 80 | Object | Infinity | Infinity | | | | |
|  | Ape. Stop | Infinity | -0.160 | | | | |
| 11 | First Lens | 1.601 | 0.610 $T_1$ | 1.546 | 56.114 | 2.583 | plastic |
| 12 |  | -10.240 | 0.050 $G_{12}$ | | | | |
| 21 | Second Lens | 7.568 | 0.243 $T_2$ | 1.656 | 21.598 | -4.679 | plastic |
| 22 |  | 2.157 | 0.371 $G_{23}$ | | | | |
| 31 | Third Lens | 15.199 | 0.302 $T_3$ | 1.640 | 23.901 | 167.704 | plastic |
| 32 |  | 17.568 | 0.256 $G_{34}$ | | | | |
| 41 | Fourth Lens | -1.982 | 0.729 $T_4$ | 1.536 | 56.273 | 2.865 | plastic |
| 42 |  | -0.977 | 0.050 $G_{45}$ | | | | |
| 51 | Fifth Lens | 4.193 | 0.722 $T_5$ | 1.536 | 56.273 | -2.930 | plastic |
| 52 |  | 1.074 | 0.300 | | | | |
| 60 | IR Filter | Infinity | 0.300 | | | | |
|  | IR Filter-Image Plane | Infinity | 0.568 | | | | |
| 71 | Image Plane | Infinity | | | | | |

FIG. 19

| No. | 11 | 12 | 21 | 22 | 31 |
|---|---|---|---|---|---|
| K | -6.3553E+00 | 0.0000E+00 | 0.0000E+00 | -1.2840E-01 | 0.0000E+00 |
| a4 | 1.8000E-01 | 1.2758E-01 | 1.1791E-01 | 1.4080E-01 | -1.7868E-01 |
| a6 | -1.3606E-01 | -3.1109E-01 | -1.9293E-01 | -8.1476E-02 | -6.3322E-02 |
| a8 | 4.8645E-02 | 2.2026E-01 | 1.4308E-01 | 1.3457E-01 | -1.9911E-02 |
| a10 | 2.5439E-02 | -1.9341E-01 | -1.8152E-01 | -1.7572E-01 | 1.1892E-01 |
| a12 | -8.4007E-02 | 7.7401E-02 | 1.4553E-01 | 1.3896E-01 | - |
| No. | 32 | 41 | 42 | 51 | 52 |
| K | 0.0000E+00 | -5.5420E+00 | -7.3799E-01 | -3.8507E+01 | -5.3622E+00 |
| a4 | -6.6824E-02 | 7.0660E-02 | 1.7355E-01 | -1.4595E-01 | -1.1903E-01 |
| a6 | -9.7870E-02 | -1.4084E-01 | -1.1102E-01 | 7.5684E-02 | 8.6847E-02 |
| a8 | 9.6452E-02 | 2.2420E-01 | 8.9395E-02 | -1.5645E-02 | -5.3579E-02 |
| a10 | - | -1.3834E-01 | -1.2887E-03 | -6.3281E-03 | 2.4166E-02 |
| a12 | - | 3.2917E-02 | -1.4705E-02 | 5.5412E-03 | -7.7419E-03 |
| a14 | - | -2.0109E-03 | 2.9362E-03 | -1.4326E-03 | 1.6946E-03 |
| a16 | - | - | - | 1.2814E-04 | -2.4027E-04 |
| a18 | - | - | - | - | 1.9927E-05 |
| a20 | - | - | - | - | -7.3556E-07 |

FIG. 20

Second Example

F= 3.78mm, HFOV=34.33cg. Fno=2.25

| No. | | Curvature Radius | Ape. Stop Distance Lens Thickness Air Gap | Refractive Index | Abbe No. | Focal Length | Material |
|---|---|---|---|---|---|---|---|
| | Object | Infinity | Infinity | | | | |
| 80 | Ape. Stop | Infinity | -0.169 | | | | |
| 11 | First Lens | 1.602 | 0.623 $T_1$ | 1.546 | 56.114 | 2.529 | plastic |
| 12 | | -8.624 | 0.050 $G_{12}$ | | | | |
| 21 | Second Lens | 7.568 | 0.235 $T_2$ | 1.656 | 21.598 | -4.768 | plastic |
| 22 | | 2.187 | 0.499 $G_{23}$ | | | | |
| 31 | Third Lens | 181.016 | 0.310 $T_3$ | 1.640 | 23.901 | 295.587 | plastic |
| 32 | | 4160.447 | 0.125 $G_{34}$ | | | | |
| 41 | Fourth Lens | -1.982 | 0.823 $T_4$ | 1.536 | 56.273 | 2.913 | plastic |
| 42 | | -1.000 | 0.061 $G_{45}$ | | | | |
| 51 | Fifth Lens | 5.669 | 0.711 $T_5$ | 1.536 | 56.273 | -2.778 | plastic |
| 52 | | 1.128 | 0.465 | | | | |
| 60 | IR Filter | Infinity | 0.300 | | | | |
| | IR Filter-Image Plane | Infinity | 0.568 | | | | |
| 71 | Image Plane | Infinity | | | | | |

FIG. 21

| No. | 11 | 12 | 21 | 22 | 31 |
|---|---|---|---|---|---|
| K | -6.2547E+00 | 0.0000E+00 | 0.0000E+00 | -1.2840E+01 | 0.0000E+00 |
| a4 | 1.7903E-01 | 1.2941E-01 | 1.1461E-01 | 1.4527E-01 | -1.8888E-01 |
| a6 | -1.3451E-01 | -3.0284E-01 | -1.9596E-01 | -7.9941E-02 | -3.7917E-02 |
| a8 | 5.3030E-02 | 2.2255E-01 | 1.4631E-01 | 1.2966E-01 | -3.5757E-02 |
| a10 | 2.7237E-02 | -1.9440E-01 | -1.8003E-01 | -1.7500E-01 | 1.2222E-01 |
| a12 | -8.4258E-02 | 7.5481E-02 | 1.4338E-01 | 1.5248E-01 | - |
| No. | 32 | 41 | 42 | 51 | 52 |
| K | 0.0000E+00 | -6.1309E+00 | -7.5334E-01 | -3.8507E+01 | -5.4913E+00 |
| a4 | -7.4582E-02 | 7.1174E-02 | 1.6265E-01 | -1.9554E-01 | -1.4845E-01 |
| a6 | -1.0233E-01 | -1.3046E-01 | -6.5066E-02 | 1.7497E-01 | 1.3790E-01 |
| a8 | 9.6735E-02 | 2.0696E-01 | 4.1410E-02 | -1.3124E-01 | -1.0717E-01 |
| a10 | - | -1.2124E-01 | 1.9487E-02 | 7.0245E-02 | 5.9615E-02 |
| a12 | - | 2.4186E-02 | -1.7826E-02 | -2.1996E-02 | -2.3012E-02 |
| a14 | - | - | 2.9767E-03 | 3.6339E-03 | 5.9746E-03 |
| a16 | - | - | - | -2.4753E-04 | -9.8960E-04 |
| a18 | - | - | - | - | 9.4053E-05 |
| a20 | - | - | - | - | -3.8892E-06 |

FIG. 22

Third Example

F= 3.98mm, HFOV=32.98 deg. Fno=2.25

| No. | | Curvature Radius | Ape. Stop Distance Lens Thickness Air Gap | Refractive Index | Abbe No. | Focal Length | Material |
|---|---|---|---|---|---|---|---|
| | Object | Infinity | Infinity | | | | |
| 80 | Ape. Stop | Infinity | -0.193 | | | | |
| 11 | First Lens | 1.565 | 0.599 $T_1$ | 1.546 | 56.114 | 2.420 | plastic |
| 12 | | -7.345 | 0.050 $G_{12}$ | | | | |
| 21 | Second Lens | 8.156 | 0.220 $T_2$ | 1.656 | 21.598 | -4.681 | plastic |
| 22 | | 2.208 | 0.639 $G_{23}$ | | | | |
| 31 | Third Lens | -13.404 | 0.323 $T_3$ | 1.640 | 23.901 | -45.882 | plastic |
| 32 | | -24.887 | 0.071 $G_{34}$ | | | | |
| 41 | Fourth Lens | -1.982 | 0.710 $T_4$ | 1.536 | 56.273 | 3.314 | plastic |
| 42 | | -1.054 | 0.050 $G_{45}$ | | | | |
| 51 | Fifth Lens | 14.913 | 0.859 $T_5$ | 1.536 | 56.273 | -2.939 | plastic |
| 52 | | 1.397 | 0.431 | | | | |
| 60 | IR Filter | Infinity | 0.300 | | | | |
| | IR Filter-Image Plane | Infinity | 0.569 | | | | |
| 71 | Image Plane | Infinity | | | | | |

FIG. 23

| No. | 11 | 12 | 21 | 22 | 31 |
|---|---|---|---|---|---|
| K | -5.7663E+00 | 0.0000E+00 | 0.0000E+00 | -1.2840E+01 | 0.0000E+00 |
| a4 | 1.7861E-01 | 1.2950E-01 | 1.0632E-01 | 1.4280E-01 | -2.0386E-01 |
| a6 | -1.2970E-01 | -2.8930E-01 | -1.9176E-01 | -7.9435E-02 | -7.2099E-03 |
| a8 | 5.7597E-02 | 2.3017E-01 | 1.6172E-01 | 1.2611E-01 | -1.1019E-02 |
| a10 | 1.8757E-02 | -1.9879E-01 | -1.7037E-01 | -1.6869E-01 | 7.3954E-02 |
| a12 | -8.6470E-02 | 6.7001E-02 | 1.3982E-01 | 1.6717E-01 | 0.0000E+00 |

| No. | 32 | 41 | 42 | 51 | 52 |
|---|---|---|---|---|---|
| K | 0.0000E+00 | -6.1309E+00 | -7.7670E-01 | -3.8507E+01 | -6.7129E+00 |
| a4 | -1.1596E-01 | 7.1174E-02 | 1.3869E-01 | -1.8817E-01 | -1.3494E-01 |
| a6 | -7.1288E-02 | -1.3046E-01 | -6.0785E-03 | 1.7885E-01 | 1.2112E-01 |
| a8 | 8.5926E-02 | 2.0696E-01 | 1.2851E-02 | -1.6608E-01 | -9.8631E-02 |
| a10 | 0.0000E+00 | -1.2124E-01 | 1.9971E-02 | 1.0888E-01 | 5.7815E-02 |
| a12 | 0.0000E+00 | 2.4186E-02 | -1.6118E-02 | -4.0470E-02 | -2.3462E-02 |
| a14 | 0.0000E+00 | 0.0000E+00 | 2.8060E-03 | 7.8874E-03 | 6.3632E-03 |
| a16 | 0.0000E+00 | 0.0000E+00 | 0.0000E+00 | -6.3836E-04 | -1.0944E-03 |
| a18 | 0.0000E+00 | 0.0000E+00 | 0.0000E+00 | 0.0000E+00 | 1.0741E-04 |
| a20 | 0.0000E+00 | 0.0000E+00 | 0.0000E+00 | 0.0000E+00 | -4.5659E-06 |

FIG. 24

Fourth Example

F= 3.50mm, HFOV=36.37 deg. Fno=2.25

| No. | | Curvature Radius | Ape. Stop Distance Lens Thickness Air Gap | Refractive Index | Abbe No. | Focal Length | Material |
|---|---|---|---|---|---|---|---|
| | Object | Infinity | Infinity | | | | |
| 80 | Ape. Stop | Infinity | -0.150 | | | | |
| 11 | First Lens | 1.605 | 0.613 T$_1$ | 1.546 | 56.114 | 2.587 | plastic |
| 12 | | -10.192 | 0.050 G$_{12}$ | | | | |
| 21 | Second Lens | 7.568 | 0.245 T$_2$ | 1.656 | 21.598 | -4.680 | plastic |
| 22 | | 2.157 | 0.380 G$_{23}$ | | | | |
| 31 | Third Lens | 15.199 | 0.332 T$_3$ | 1.640 | 23.901 | 166.910 | plastic |
| 32 | | 17.568 | 0.241 G$_{34}$ | | | | |
| 41 | Fourth Lens | -1.987 | 0.688 T$_4$ | 1.536 | 56.273 | 2.898 | plastic |
| 42 | | -0.977 | 0.058 G$_{45}$ | | | | |
| 51 | Fifth Lens | 4.162 | 0.744 T$_5$ | 1.536 | 56.273 | -2.965 | plastic |
| 52 | | 1.079 | 0.440 | | | | |
| 60 | IR Filter | Infinity | 0.300 | | | | |
| | IR Filter-Image Plane | Infinity | 0.478 | | | | |
| 71 | Image Plane | Infinity | 0.005 | | | | |

FIG. 25

| No. | 11 | 12 | 21 | 22 | 31 |
|---|---|---|---|---|---|
| K | -6.3918E+00 | 0.0000E+00 | 0.0000E+00 | -1.2840E+01 | 0.0000E+00 |
| a4 | 1.7832E-01 | 1.2330E-01 | 1.1685E-01 | 1.4259E-01 | -1.8003E-01 |
| a6 | -1.3852E-01 | -3.1142E-01 | -1.9287E-01 | -8.1058E-02 | -5.8637E-02 |
| a8 | 4.8649E-02 | 2.2091E-01 | 1.4352E-01 | 1.3297E-01 | -2.1348E-02 |
| a10 | 2.7085E-02 | -1.9318E-01 | -1.8107E-01 | -1.7799E-01 | 1.1787E-01 |
| a12 | -8.5623E-02 | 8.1012E-02 | 1.4681E-01 | 1.3725E-01 | - |
| No. | 32 | 41 | 42 | 51 | 52 |
| K | 0.0000E+00 | -5.5349E+00 | -7.2620E-01 | -3.8507E+01 | -5.5870E+00 |
| a4 | -6.5560E-02 | 7.1639E-02 | 1.6631E-01 | -1.4941E-01 | -9.8886E-02 |
| a6 | -1.0228E-01 | -1.4092E-01 | -1.0836E-01 | 9.5271E-02 | 6.3178E-02 |
| a8 | 9.9695E-02 | 2.1558E-01 | 1.1252E-01 | -3.6636E-02 | -3.3192E-02 |
| a10 | - | -1.2428E-01 | -3.1803E-02 | 3.4217E-03 | 1.2396E-02 |
| a12 | - | 2.6675E-02 | 2.0142E-04 | 3.5450E-03 | -3.2665E-03 |
| a14 | - | -1.3594E-03 | 7.0108E-05 | -1.3294E-03 | 5.9078E-04 |
| a16 | - | - | - | 1.3854E-04 | -7.0130E-05 |
| a18 | - | - | - | - | 5.0420E-06 |
| a20 | - | - | - | - | -1.7252E-07 |

Fifth Example
F= 3.64mm, HFOV=35.62 deg. Fno=2.25

| No. | | Curvature Radius | Ape. Stop Distance Lens Thickness Air Gap | Refractive Index | Abbe No. | Focal Length | Material |
|---|---|---|---|---|---|---|---|
| | Object | Infinity | Infinity | | | | |
| 80 | Ape. Stop | Infinity | -0.120 | | | | |
| 11 | First Lens | 1.593 | 0.624 $T_1$ | 1.546 | 56.114 | 2.544 | plastic |
| 12 | | -9.350 | 0.050 $G_{12}$ | | | | |
| 21 | Second Lens | 7.568 | 0.238 $T_2$ | 1.656 | 21.598 | -4.696 | plastic |
| 22 | | 2.163 | 0.405 $G_{23}$ | | | | |
| 31 | Third Lens | 15.199 | 0.228 $T_3$ | 1.640 | 23.901 | 169.668 | plastic |
| 32 | | 17.568 | 0.252 $G_{34}$ | | | | |
| 41 | Fourth Lens | -2.138 | 0.890 $T_4$ | 1.536 | 56.273 | 2.860 | plastic |
| 42 | | -1.023 | 0.050 $G_{45}$ | | | | |
| 51 | Fifth Lens | 3.731 | 0.676 $T_5$ | 1.536 | 56.273 | -2.874 | plastic |
| 52 | | 1.022 | 0.440 | | | | |
| 60 | IR Filter | Infinity | 0.300 | | | | |
| | IR Filter-Image Plane | Infinity | 0.529 | | | | |
| 71 | Image Plane | Infinity | 0.005 | | | | |

| No. | 11 | 12 | 21 | 22 | 31 |
|---|---|---|---|---|---|
| K | -6.2385E+00 | 0.0000E+00 | 0.0000E+00 | -1.2840E+01 | 0.0000E+00 |
| a4 | 1.8069E-01 | 1.2718E-01 | 1.1499E-01 | 1.4559E-01 | -1.8003E-01 |
| a6 | -1.3490E-01 | -3.0802E-01 | -1.9309E-01 | -8.4844E-02 | -5.8637E-02 |
| a8 | 5.0610E-02 | 2.2046E-01 | 1.4342E-01 | 1.3798E-01 | -2.1348E-02 |
| a10 | 2.6748E-02 | -1.9503E-01 | -1.8184E-01 | -1.6990E-01 | 1.1787E-01 |
| a12 | -8.5620E-02 | 7.7560E-02 | 1.4581E-01 | 1.3883E-01 | - |

| No. | 32 | 41 | 42 | 51 | 52 |
|---|---|---|---|---|---|
| K | 0.0000E+00 | -4.8318E+00 | -7.1961E-01 | -3.8507E+01 | -4.6678E+00 |
| a4 | -7.8762E-02 | 5.5972E-02 | 1.5050E-01 | -1.4400E-01 | -1.4064E-01 |
| a6 | -9.4549E-02 | -1.0241E-01 | -5.9473E-02 | 9.4595E-02 | 1.1676E-01 |
| a8 | 1.0144E-01 | 1.6704E-01 | 2.4753E-02 | -4.3257E-02 | -7.7949E-02 |
| a10 | - | -9.8280E-02 | 2.8245E-02 | 1.5785E-02 | 3.7190E-02 |
| a12 | - | 1.4961E-02 | -1.9815E-02 | -3.9415E-03 | -1.2317E-02 |
| a14 | - | 1.9894E-03 | 3.2788E-03 | 5.6941E-04 | 2.7400E-03 |
| a16 | - | - | - | -3.6151E-05 | -3.8916E-04 |
| a18 | - | - | - | - | 3.1827E-05 |
| a20 | - | - | - | - | -1.1405E-06 |

FIG. 28

Sixth Example

F= 3.36mm, HFOV=37.57 deg. Fno=2.25

| No. | | Curvature Radius | Ape. Stop Distance Lens Thickness Air Gap | Refractive Index | Abbe No. | Focal Length | Material |
|---|---|---|---|---|---|---|---|
| | Object | Infinity | Infinity | | | | |
| 80 | Ape. Stop | Infinity | -0.142 | | | | |
| 11 | First Lens | 1.552 | 0.691 $T_1$ | 1.546 | 56.114 | 2.362 | plastic |
| 12 | | -6.420 | 0.050 $G_{12}$ | | | | |
| 21 | Second Lens | 13.381 | 0.220 $T_2$ | 1.656 | 21.598 | -3.949 | plastic |
| 22 | | 2.157 | 0.449 $G_{23}$ | | | | |
| 31 | Third Lens | 386.900 | 0.307 $T_3$ | 1.640 | 23.901 | -70.938 | plastic |
| 32 | | 40.633 | 0.216 $G_{34}$ | | | | |
| 41 | Fourth Lens | -2.619 | 0.614 $T_4$ | 1.536 | 56.273 | 3.158 | plastic |
| 42 | | -1.113 | 0.345 $G_{45}$ | | | | |
| 51 | Fifth Lens | 2.640 | 0.530 $T_5$ | 1.536 | 56.273 | -2.986 | plastic |
| 52 | | 0.927 | 0.420 | | | | |
| 60 | IR Filter | Infinity | 0.300 | | | | |
| | IR Filter- Image Plane | Infinity | 0.205 | | | | |
| 71 | Image Plane | Infinity | 0.000 | | | | |

FIG. 29

| No. | 11 | 12 | 21 | 22 | 31 |
|---|---|---|---|---|---|
| K | -5.6450E+00 | 0.0000E+00 | 0.0000E+00 | -1.2840E+01 | 0.0000E+00 |
| a4 | 1.7902E-01 | 1.2479E-01 | 9.9974E-02 | 1.4416E-01 | -2.0526E-01 |
| a6 | -1.2910E-01 | -3.0025E-01 | -1.8861E-01 | -7.2654E-02 | -4.5099E-02 |
| a8 | 5.6986E-02 | 2.2691E-01 | 1.5528E-01 | 1.3791E-01 | 8.8062E-03 |
| a10 | 2.1608E-02 | -1.8876E-01 | -1.8167E-01 | -1.6652E-01 | 5.5888E-02 |
| a12 | -7.9336E-02 | 6.7784E-02 | 1.3789E-01 | 1.3948E-01 | - |
| No. | 32 | 41 | 42 | 51 | 52 |
| K | 0.0000E+00 | -3.0911E+00 | -6.6957E-01 | -3.8507E+01 | -4.7958E+00 |
| a4 | -1.1161E-01 | 6.7084E-02 | 9.3912E-02 | -1.3840E-01 | -1.0238E-01 |
| a6 | -8.5534E-02 | -8.7115E-02 | 2.3766E-03 | 7.2691E-02 | 7.2514E-02 |
| a8 | 6.1766E-02 | 3.5681E-04 | -2.3207E-02 | -1.5466E-02 | -4.0964E-02 |
| a10 | 1.6592E-02 | 1.1004E-01 | 5.0636E-02 | -5.1872E-03 | 1.6463E-02 |
| a12 | -6.3908E-03 | -8.5714E-02 | -2.7464E-02 | 4.8046E-03 | -4.3638E-03 |
| a14 |  | 1.9564E-02 | 4.5807E-03 | -1.3990E-03 | 6.9546E-04 |
| a16 |  | - | - | 1.8692E-04 | -5.9291E-05 |
| a18 |  | - | - | -9.6999E-06 | 2.0581E-06 |

FIG. 30

| | | Seventh Example | | | | |
|---|---|---|---|---|---|---|
| | | F= 3.68mm, HFOV=35.14 deg. Fno=2.25 | | | | |
| No. | | Curvature Radius | Ape. Stop Distance Lens Thickness Air Gap | Refractive Index | Abbe No. | Focal Length | Material |
| | Object | Infinity | Infinity | | | | |
| 80 | Ape. Stop | Infinity | -0.153 | | | | |
| 11 | First Lens | 1.568 | 0.626 $T_1$ | 1.546 | 56.114 | 2.537 | plastic |
| 12 | | -10.192 | 0.050 $G_{12}$ | | | | |
| 21 | Second Lens | 7.568 | 0.249 $T_2$ | 1.656 | 21.598 | -4.682 | plastic |
| 22 | | 2.157 | 0.418 $G_{23}$ | | | | |
| 31 | Third Lens | 7.041 | 0.220 $T_3$ | 1.640 | 23.901 | 49.983 | plastic |
| 32 | | 8.916 | 0.186 $G_{34}$ | | | | |
| 41 | Fourth Lens | -2.018 | 0.857 $T_4$ | 1.536 | 56.273 | 2.981 | plastic |
| 42 | | -1.024 | 0.198 $G_{45}$ | | | | |
| 51 | Fifth Lens | 2.732 | 0.442 $T_5$ | 1.536 | 56.273 | -2.815 | plastic |
| 52 | | 0.918 | 0.440 | | | | |
| 60 | IR Filter | Infinity | 0.300 | | | | |
| | IR Filter-Image Plane | Infinity | 0.562 | | | | |
| 71 | Image Plane | Infinity | 0.005 | | | | |

FIG. 31

| No. | 11 | 12 | 21 | 22 | 31 |
|---|---|---|---|---|---|
| K | -5.9553E+00 | 0.0000E+00 | 0.0000E+00 | -1.2840E+01 | 0.0000E+00 |
| a4 | 1.8127E-01 | 1.2337E-01 | 1.1685E-01 | 1.5504E-01 | -1.7465E-01 |
| a6 | -1.3391E-01 | -3.0211E-01 | -1.9287E-01 | -7.6907E-02 | -1.2123E-01 |
| a8 | 5.1361E-02 | 2.1962E-01 | 1.4352E-01 | 1.3538E-01 | 1.1766E-02 |
| a10 | 2.5309E-02 | -1.9729E-01 | -1.8107E-01 | -1.7286E-01 | 1.3469E-01 |
| a12 | -8.2600E-02 | 8.2330E-02 | 1.4681E-01 | 1.4770E-01 | - |

| No. | 32 | 41 | 42 | 51 | 52 |
|---|---|---|---|---|---|
| K | 0.0000E+00 | -5.8635E+00 | -7.3255E-01 | -3.8507E+01 | -5.1667E+00 |
| a4 | -5.1505E-02 | 7.2618E-02 | 1.6744E-01 | -2.1232E-01 | -1.7626E-01 |
| a6 | -2.0050E-01 | -1.3601E-01 | -9.5102E-02 | 1.3724E-01 | 1.4176E-01 |
| a8 | 1.6372E-01 | 2.0204E-01 | 6.2876E-02 | -6.1080E-02 | -9.5497E-02 |
| a10 | - | -1.0316E-01 | 1.9806E-02 | 2.0475E-02 | 4.8373E-02 |
| a12 | - | 9.3038E-03 | -2.2404E-02 | -5.2843E-03 | -1.8229E-02 |
| a14 | - | 3.6049E-03 | 3.9274E-03 | 1.0698E-03 | 4.9373E-03 |
| a16 | - | - | - | -1.1800E-04 | -9.0686E-04 |
| a18 | - | - | - | - | 1.0054E-04 |
| a20 | - | - | - | - | -5.0381E-06 |

FIG. 32

|  | First Example | Second Example | Third Example | Fourth Example | Fifth Example | Sixth Example | Seventh Example |
|---|---|---|---|---|---|---|---|
| $T_3$ | 0.30 | 0.31 | 0.32 | 0.33 | 0.23 | 0.31 | 0.22 |
| $T_4$ | 0.73 | 0.82 | 0.71 | 0.69 | 0.89 | 0.61 | 0.86 |
| $T_5$ | 0.72 | 0.71 | 0.86 | 0.74 | 0.68 | 0.53 | 0.44 |
| $G_{23}$ | 0.37 | 0.50 | 0.64 | 0.38 | 0.41 | 0.45 | 0.42 |
| $G_{34}$ | 0.26 | 0.12 | 0.07 | 0.24 | 0.25 | 0.22 | 0.19 |
| $T_{al}$ | 2.61 | 2.70 | 2.71 | 2.62 | 2.66 | 2.36 | 2.39 |
| $G_{aa}$ | 0.73 | 0.73 | 0.81 | 0.73 | 0.76 | 1.06 | 0.85 |
| $L_{tt}$ | 4.61 | 4.77 | 4.82 | 4.57 | 4.69 | 4.35 | 4.55 |
| $G_{23}/G_{34}$ | 1.45 | 4.00 | 9.00 | 1.58 | 1.61 | 2.08 | 2.25 |
| $T_5/G_{aa}$ | 0.99 | 0.97 | 1.06 | 1.02 | 0.89 | 0.50 | 0.52 |
| $T_4/G_{aa}$ | 1.00 | 1.12 | 0.88 | 0.94 | 1.18 | 0.58 | 1.01 |
| $T_{al}/L_{tt}$ | 0.56 | 0.57 | 0.56 | 0.57 | 0.57 | 0.54 | 0.53 |
| $T_{al}/G_{aa}$ | 3.59 | 3.68 | 3.35 | 3.60 | 3.51 | 2.23 | 2.81 |
| $T_4/T_3$ | 2.41 | 2.65 | 2.20 | 2.07 | 3.90 | 2.00 | 3.90 |
| $T_5/T_3$ | 2.39 | 2.29 | 2.66 | 2.24 | 2.96 | 1.72 | 2.01 |
| $T_4/G_{34}$ | 2.85 | 6.60 | 10.00 | 2.85 | 3.53 | 2.85 | 4.61 |

FIG. 33

OPTICAL IMAGING LENS SET AND ELECTRONIC DEVICE COMPRISING THE SAME

CROSS REFERENCE TO RELATED APPLICATION

This application claims priority to Taiwanese Application No. 101151012, filed on Dec. 28, 2012.

BACKGROUND OF THE INVENTION

1. Field of the Invention

The present invention generally relates to an optical imaging lens set and an electronic device includes such optical imaging lens set. Specifically speaking, the present invention is directed to an optical imaging lens set of five lens elements and an electronic device includes such optical imaging lens set of five lens elements.

2. Description of the Prior Art

In recent years, the popularity of mobile phones and digital cameras makes the photography modules of various portable electronic products, such as optical imaging lens elements or an image sensor . . . develop quickly, and the shrinkage of mobile phones and digital cameras also makes a greater and greater demand for the miniaturization of the photography module. With the development and shrinkage of a charge coupled device (CCD) or a complementary metal oxide semiconductor element (CMOS), the optical imaging lens set installed in the photography module shrinks to meet the demands as well. However, good optical properties, such as the system aberration, as well as production cost and production feasibility should be taken into consideration, too. The current trend of research is to develop an optical imaging lens set of a shorter length with uncompromised good quality.

For example, U.S. Patent Publication No. 2011/0176049, 2011/0316969 and U.S. Pat. No. 7,480,105 all disclose an optical imaging lens set structure of five lens elements with the first lens element of negative refractive power. Further, U.S. Patent Publication No. 2010/0254029, Japanese Patent Publication No. 2008-281760, Taiwan Patent Publication No. M 369459 and 1268360 all disclose an optical imaging lens set of five lens elements with a thicker fifth lens element. Also, U.S. Patent Publication No. 2012/0069455, 2012/0087019, 2012/0087020, Japanese Patent Publication No. 2010-224521, 2010-152042, 2010-026434 and Taiwan Patent Publication No. 201215942, 201213926 all disclose a structure of five lens elements, but the total air gaps among the lens elements in the optical imaging lens set is too large to be acceptable. In particular, the total length of the optical imaging lens set of Japanese Patent Publication No. 2008-281760 is even over 16 mm. These disclosed dimensions do not show good examples of the shrinkage of portable electronic products, such as mobile phones and digital cameras.

SUMMARY OF THE INVENTION

In the light of the above, the present invention proposes an optical imaging lens set of lightweight, low production cost, reduced length, high resolution and high image quality. The optical imaging lens set of five lens elements of the present invention has a first lens element, a second lens element, a third lens element, a fourth lens element and a fifth lens element sequentially from an object side to an image side along an optical axis.

In the optical imaging lens set of the present invention, the first lens element has positive refractive power and a first image-side surface facing toward the object side. The first image-side surface has a convex part in a vicinity of a circular periphery of the first lens element. The second lens element has a second object-side surface facing toward the object side. The second object-side surface has a convex part in a vicinity of a circular periphery of the second lens element. The third lens element has a third object-side surface facing toward the object side. The third object-side surface has a concave part in a vicinity of a circular periphery of the third lens element. The fourth lens element has a fourth object-side surface facing toward the object side. The fourth object-side surface is a concave surface. The plastic fifth lens element has a fifth image-side surface facing toward the image side. The fifth image-side surface has a concave part in a vicinity of the optical axis. There are only five lens elements of refractive power in the optical imaging lens set. The optical imaging lens set has an air gap with a thickness $G_{23}$ and disposed between the second lens element and the third lens element as well as an air gap with a thickness $G_{34}$ and disposed between the third lens element and the fourth lens element, and satisfies a relationship $1.40 \leq G_{23}/G_{34}$.

In the optical imaging lens set, the total four air gaps $G_{aa}$ from the first lens element to the fifth lens element along the optical axis, and a thickness $T_5$ of the fifth lens element along the optical axis satisfy a relationship $0.50 \leq T_5/G_{aa}$.

In the optical imaging lens set, the total thickness $T_{al}$ of the first lens element, the second lens element, the third lens element, the fourth lens element and the fifth lens element along the optical axis, and a distance $L_{tt}$ from the first object-side surface to an imaging plane on the image side satisfy a relationship $0.55 \leq T_{al}/L_{tt}$.

In the optical imaging lens set, the thickness $T_3$ of the third lens element along the optical axis satisfies a relationship $2 T_5/T_3$.

In the optical imaging lens set, the thickness $T_4$ of the fourth lens element along the optical axis satisfies a relationship $0.53 \leq T_4/G_{aa}$.

In the optical imaging lens set, the thickness $T_3$ of the third lens element along the optical axis and a thickness $T_4$ of the fourth lens element along the optical axis satisfy a relationship $2 \leq T_4/T_3$.

In the optical imaging lens set, the total thickness $T_{al}$ of the first lens element, the second lens element, the third lens element, the fourth lens element and the fifth lens element along the optical axis, and total four air gaps $G_{aa}$ between the first lens element and the fifth lens element along the optical axis satisfy a relationship $2.8 \leq T_{al}/G_{aa}$.

In the optical imaging lens set, the thickness $T_4$ of the fourth lens element along the optical axis satisfies a relationship $2.85 \leq T_4/G_{34}$.

The present invention also proposes an electronic device which includes the optical imaging lens set as described above. The electronic device includes a case and an image module disposed in the case. The image module includes an optical imaging lens set, a barrel, a module housing unit, and an image sensor. The barrel is for the installation of the optical imaging lens set. The module housing unit is for the installation of the barrel, and the image sensor is disposed at an image side of the optical imaging lens set.

In the electronic device, the module housing unit has a lens backseat with a first seat element and a second seat element. The first seat element is externally attached to the barrel and disposed along an axis. The second seat element is disposed along the axis and surrounds the first seat element so that the first seat element, the barrel and the optical imaging lens set can be movable together with respect to the image sensor along the optical axis.

In the electronic device, the module housing unit further includes an image sensor base which is disposed between the second seat element and the image sensor to be attached to the second seat element.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 19 shows the optical data of the first example of the optical imaging lens set.

FIG. 20 shows the aspheric surface data of the first example.

FIG. 21 shows the optical data of the second example of the optical imaging lens set.

FIG. 22 shows the aspheric surface data of the second example.

FIG. 23 shows the optical data of the third example of the optical imaging lens set.

FIG. 24 shows the aspheric surface data of the third example.

FIG. 25 shows the optical data of the fourth example of the optical imaging lens set.

FIG. 26 shows the aspheric surface data of the fourth example.

FIG. 27 shows the optical data of the fifth example of the optical imaging lens set.

FIG. 28 shows the aspheric surface data of the fifth example.

FIG. 29 shows the optical data of the sixth example of the optical imaging lens set.

FIG. 30 shows the aspheric surface data of the sixth example.

FIG. 31 shows the optical data of the seventh example of the optical imaging lens set.

FIG. 32 shows the aspheric surface data of the seventh example.

FIG. 33 shows some important ratios in each example.

DETAILED DESCRIPTION

Figure 1:
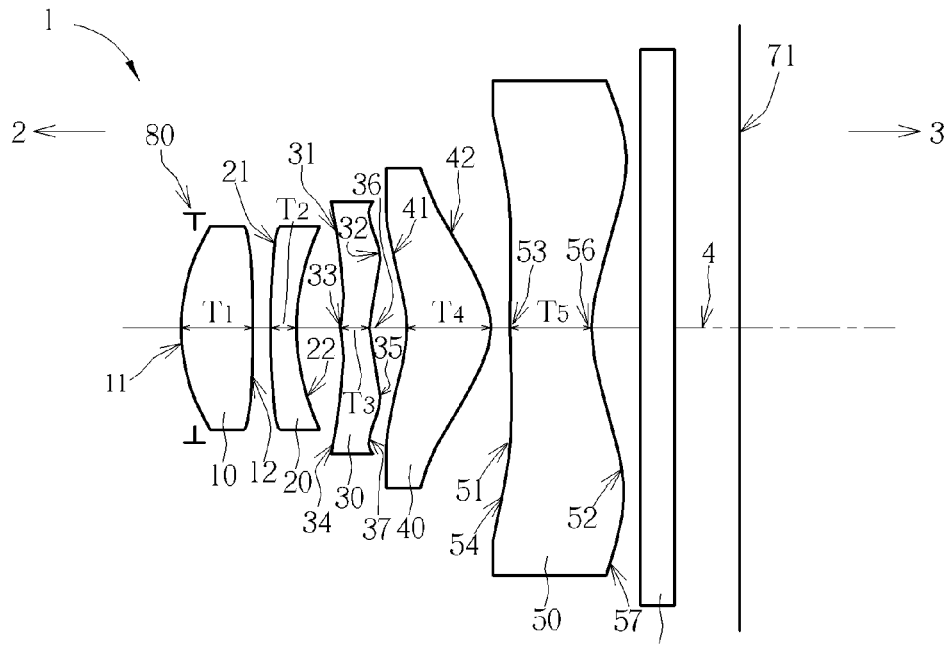
FIG. 1 illustrates a first example of the optical imaging lens set of five lens elements of the present invention.

In the present invention, similar (not necessarily identical) elements share the same numeral references. As shown in FIG. 1, the optical imaging lens set 1 of five lens elements of the present invention, sequentially from an object side 2 (where an object is located) to an image side 3 along an optical axis 4, has a first lens element 10, a second lens element 20, a third lens element 30, a fourth lens element 40, a fifth lens element 50, a filter 60 and an imaging plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this. The optical axis 4 is the optical axis of the entire optical imaging lens set 1, so the optical axis of each of the lens elements is the optical axis of the optical imaging lens set 1.

Furthermore, the optical imaging lens set 1 includes an aperture stop (ape. stop) 80 disposed in an appropriate position. In FIG. 1, the aperture stop 80 is disposed in front of the first lens element 10, and between the first lens element 10 and the object side 2, but the present invention is not limited to this. When light (not shown) emitted or reflected by an object (not shown) which is located at the object side 2 enters the optical imaging lens set 1 of the present invention, it forms a clear image on the imaging plane 71 at the image side 3 after passing through the aperture stop 80, the first lens element 10, the second lens element 20, the third lens element 30, the fourth lens element 40, the fifth lens element 50 and the filter 60.

In the embodiments of the present invention, the optional filter 60 may be a filter of various suitable functions, for example, the filter 60 may be an infrared cut filter (IR cut filter), placed between the fifth lens element 50 and the imaging plane 71. The filter 60 is made of glass, without affecting the focal length of the optical lens element system, namely the optical imaging lens set, of the present invention.

Each lens element in the optical imaging lens set 1 of the present invention has an object-side surface facing toward the object side 2 as well as an image-side surface facing toward the image side 3. In addition, each lens element in the optical imaging lens set 1 of the present invention has a part in a vicinity of its circular periphery (circular periphery part) as well as a part in a vicinity of the optical axis 4 (optical axis part). For example, the first lens element 10 has a first object-side surface 11, a first image-side surface 12, a circular periphery part in a vicinity of its circular periphery and an optical axis part in a vicinity of the optical axis 4; the second lens element 20 has a second object-side surface 21, a second image-side surface 22, a circular periphery part in a vicinity of its circular periphery and an optical axis part in a vicinity of the optical axis 4; the third lens element 30 has a third object-side surface 31, a third image-side surface 32, a circular periphery part in a vicinity of its circular periphery and an optical axis part in a vicinity of the optical axis 4; the fourth lens element 40 has a fourth object-side surface 41, a fourth image-side surface 42, a circular periphery part in a vicinity of its circular periphery and an optical axis part in a vicinity of the optical axis 4; the fifth lens element 50 has a fifth object-side surface 51, a fifth image-side surface 52, a circular periphery part in a vicinity of its circular periphery and an optical axis part in a vicinity of the optical axis 4.

Each lens element in the optical imaging lens set 1 of the present invention further has a central thickness T along the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, and the fifth lens element 50 has a fifth lens element thickness $T_5$. Therefore, the total thickness of all the lens elements in the optical imaging lens set 1 along the optical axis 4 is $T_{al}=T_1+T_2+T_3+T_4+T_5$.

In addition, between two adjacent lens elements in the optical imaging lens set 1 of the present invention there is an air gap G along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50. Therefore, the total four air gaps between adjacent lens elements from the first lens element 10 to the fifth lens element 50 along the optical axis 4 is $G_{aa}=G_{12}+G_{23}+G_{34}+G_{45}$. Also, a distance from the first object-side 11 of the first lens element 10 facing toward the object side 2 to an imaging plane 71 on the image side 3 along the optical axis 4 is $L_{tt}$.

First Example

Figures 2A, 2B, 2C, 2D:
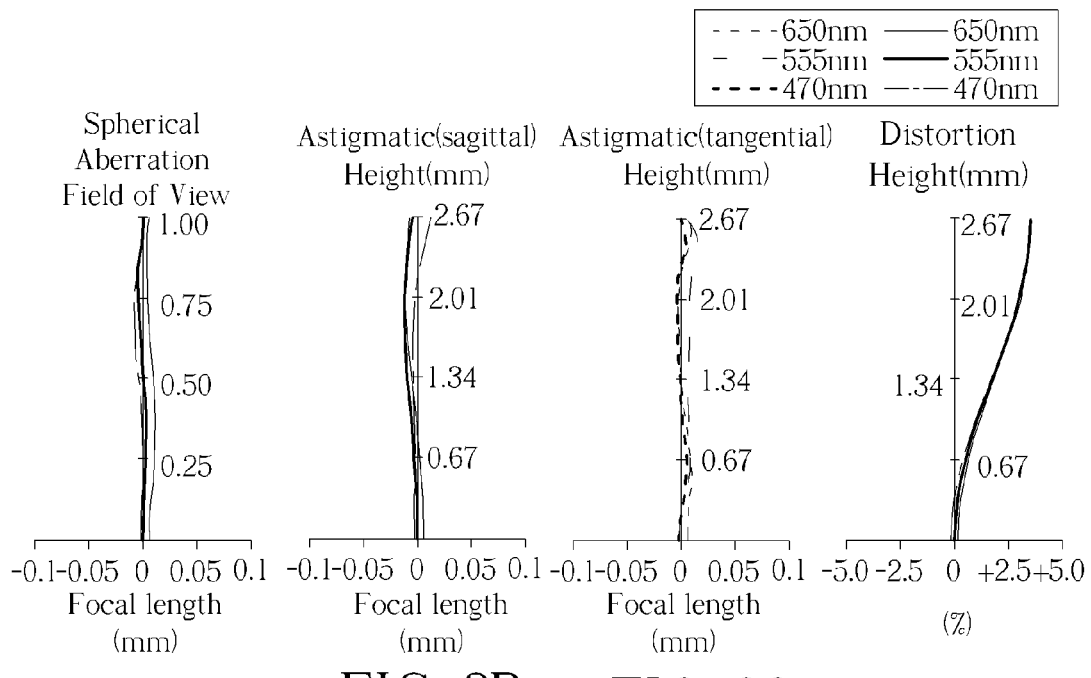
FIG. 2A illustrates the longitudinal spherical aberration on the imaging plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the imaging plane 71 of the first example; please refer to FIG. 2B for the astigmatic aberration on the sagittal direction; please refer to FIG. 2C for the astigmatic aberration on the tangential direction, and please refer to FIG. 2D for the distortion aberration.

The optical imaging lens set 1 of the first example has five lens elements 10 to 50, each is made of a plastic material and has refractive power. The optical imaging lens set 1 also has an aperture stop 80, a filter 60, and an imaging plane 71. The aperture stop 80 is provided in front of the first lens element 10, i.e. between the first lens element 10 and the object side 2.

The first lens element 10 has positive refractive power. The first object-side surface 11 facing toward the object side 2 is a convex surface and the first image-side surface 12 facing toward the image side 3 is also a convex surface. Both the first object-side surface 11 and the first image-side 12 of the first lens element 10 are aspherical surfaces.

The second lens element 20 has negative refractive power. The second object-side surface 21 facing toward the object side 2 is a convex surface and the second image-side surface 22 facing toward the image side 3 is a concave surface. In addition, both the second object-side surface 21 and the second image-side surface 22 of the second lens element 20 are aspherical surfaces.

The third lens element 30 has positive refractive power, a third object-side surface 31 facing toward the object side 2 and a third image-side surface 32 facing toward the image side 3. The third object-side surface 31 has a convex part 33 (convex optical axis part) in a vicinity of an optical axis 4 and a concave part 34 (concave circular periphery part) in a vicinity of its circular periphery. The third image-side surface 32 has a concave part 36 (concave optical axis part) in a vicinity of the optical axis 4, a concave part 37 (concave circular periphery part) in a vicinity of its circular periphery, and a convex part 35 between the optical axis 4 and its circular periphery. In addition, both the third object-side surface 31 and the third image-side surface 32 of the third lens element 30 are aspherical surfaces.

The fourth lens element 40 has positive refractive power. The fourth object-side surface 41 facing toward the object side 2 is a concave surface and the fourth image-side surface 42 facing toward the image side 3 is a convex surface. Both the fourth object-side surface 41 and the fourth image-side 42 of the fourth lens element 40 are aspherical surfaces.

A fifth lens element 50 has negative refractive power, a fifth object-side surface 51 facing toward the object side 2 and a fifth image-side surface 52 facing toward the image side 3. The fifth object-side surface 51 has a convex part 53 (convex optical axis part) in a vicinity of the optical axis 4 and a concave part 54 (concave circular periphery part) in a vicinity of its circular periphery. The fifth image-side surface 52 has a concave part 56 (concave optical axis part) in the vicinity of the optical axis 4 and a convex part 57 (convex circular periphery part) in a vicinity of its circular periphery. Further, both the fifth object-side surface 51 and the fifth image-side 52 of the fifth lens element 50 are aspherical surfaces. The filter 60 may be an infrared filter, and is disposed between the fifth lens element 50 and the imaging plane 71.

In the optical imaging lens element 1 of the present invention, the object side 11/21/31/41/51 and image side 12/22/32/42/52 from the first lens element 10 to the fifth lens element 50, total of ten surfaces are aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant;

$a_{2i}$ is the aspheric coefficient of the 2i order.

The optical data of the first example of the optical imaging lens set 1 are shown in FIG. 19 while the aspheric surface data are shown in FIG. 20. In the following examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set is 4.61 mm. Some important ratios of the first example are as follows:

$G_{23}/G_{34}$=1.45
$T_5/G_{aa}$=0.99
$T_4/G_{aa}$=1.00
$T_{al}/L_{tt}$=0.56
$T_{al}/G_{aa}$=3.59
$T_4/T_3$=2.41
$T_5/T_3$=2.39
$T_4/G_{34}$=2.85

Second Example

Figure 3:
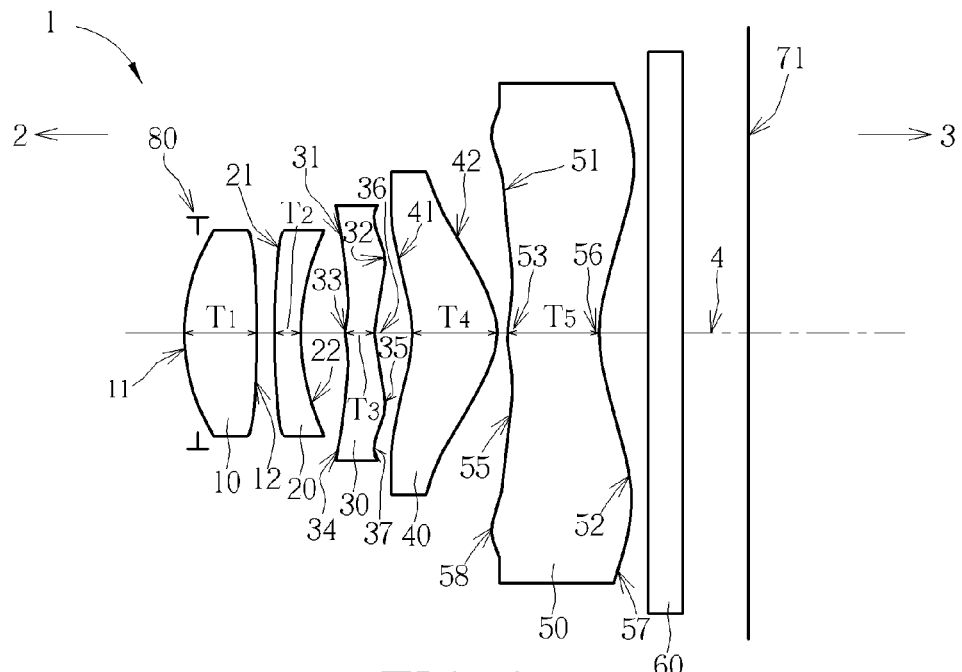
FIG. 3 illustrates a second example of the optical imaging lens set of five lens elements of the present invention.
Figures 4A, 4B, 4C, 4D:
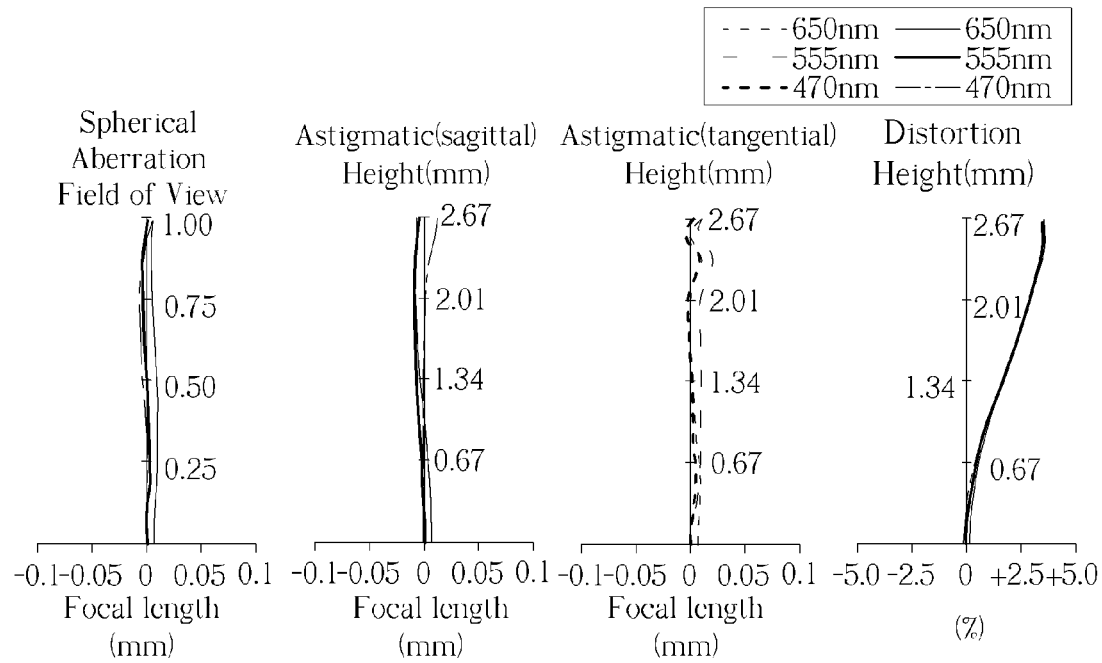
FIG. 4A illustrates the longitudinal spherical aberration on the imaging plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. Please refer to FIG. 4A for the longitudinal spherical aberration on the imaging plane 71 of the first example; please refer to FIG. 4B for the astigmatic aberration on the sagittal direction; please refer to FIG. 4C for the astigmatic aberration on the tangential direction, and please refer to FIG. 4D for the distortion aberration. The second example is similar with the first example. The differences are that the fifth object-side surface 51 has a convex part 53 in a vicinity of the optical axis 4, a convex part 58 in a vicinity of its circular periphery and a concave part 55 between the optical axis 4 and its circular periphery. The optical data of the first example of the optical imaging lens set are shown in FIG. 21 while the aspheric surface data are shown in FIG. 22. The length of the optical imaging lens set is 4.77 mm. Some important ratios of the first example are as follows:

$G_{23}/G_{34}$=4.00
$T_5/G_{aa}$=0.97
$T_4/G_{aa}$=1.12
$T_{al}/L_{tt}$=0.57
$T_{al}/G_{aa}$=3.68
$T_4/T_3$=2.65
$T_5/T_3$=2.29
$T_4/G_{34}$=6.60

Third Example

Figure 5:
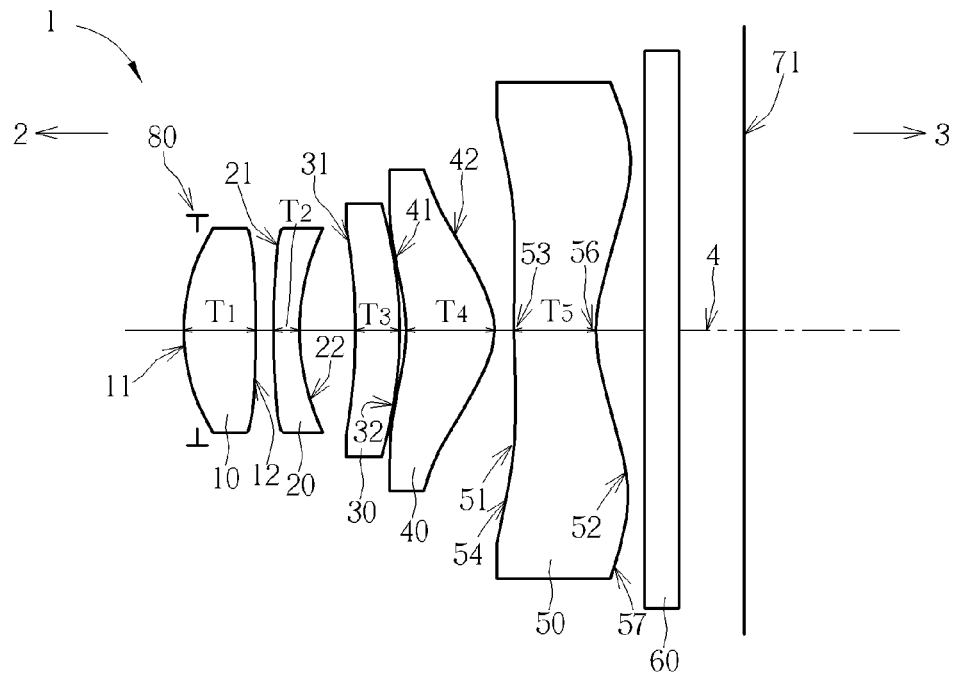
FIG. 5 illustrates a third example of the optical imaging lens set of five lens elements of the present invention.
Figures 6A, 6B, 6C, 6D:
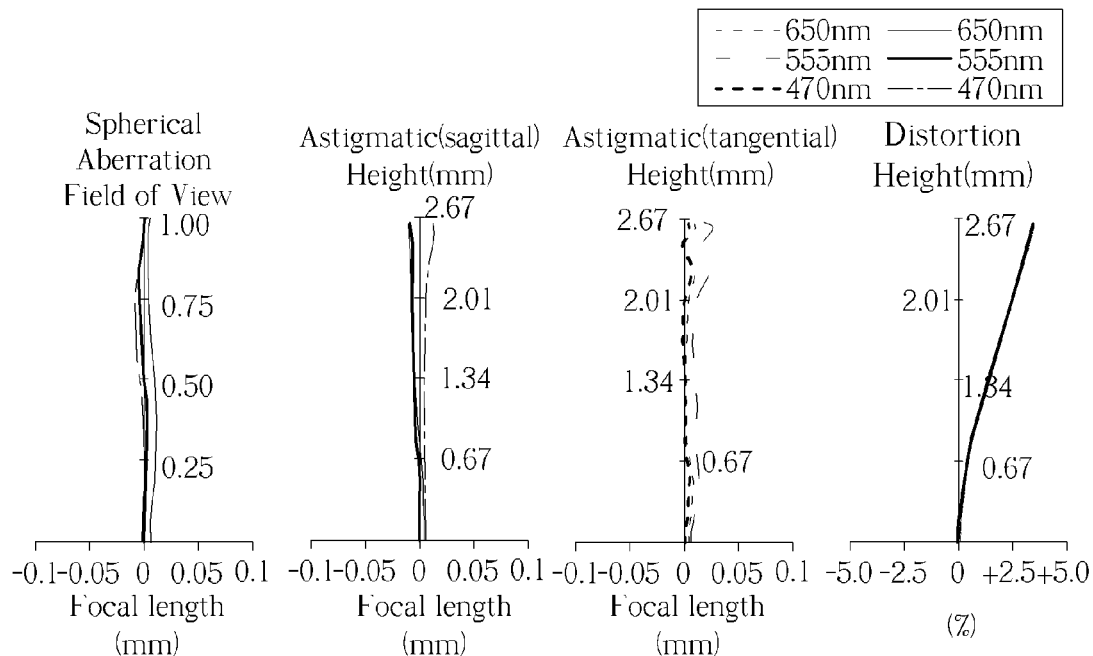
FIG. 6A illustrates the longitudinal spherical aberration on the imaging plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the imaging plane 71 of the first example; please refer to FIG. 6B for the astigmatic aberration on the sagittal direction; please refer to FIG. 6C for the astigmatic aberration on the tangential direction, and please refer to FIG. 6D for the distortion aberration. The third example is similar with the first example. The differences are that the third lens element 30 has negative refractive power, the third object-side surface 31 is a concave surface and the third image-side surface 32 is a convex surface. The optical data of the first example of the optical imaging lens set are shown in FIG. 23 while the aspheric surface data are shown in FIG. 24. The length of the optical imaging lens set is 4.82 mm. Some important ratios of the first example are as follows:

$G_{23}/G_{34}$=9.00
$T_5/G_{aa}$=1.06
$T_4/G_{aa}$=0.88
$T_{al}/L_{tt}$=0.56
$T_{al}/G_{aa}$=3.35
$T_4/T_3$=2.20
$T_5/T_3$=2.66
$T_4/G_{34}$=10.00

Fourth Example

Figure 7:
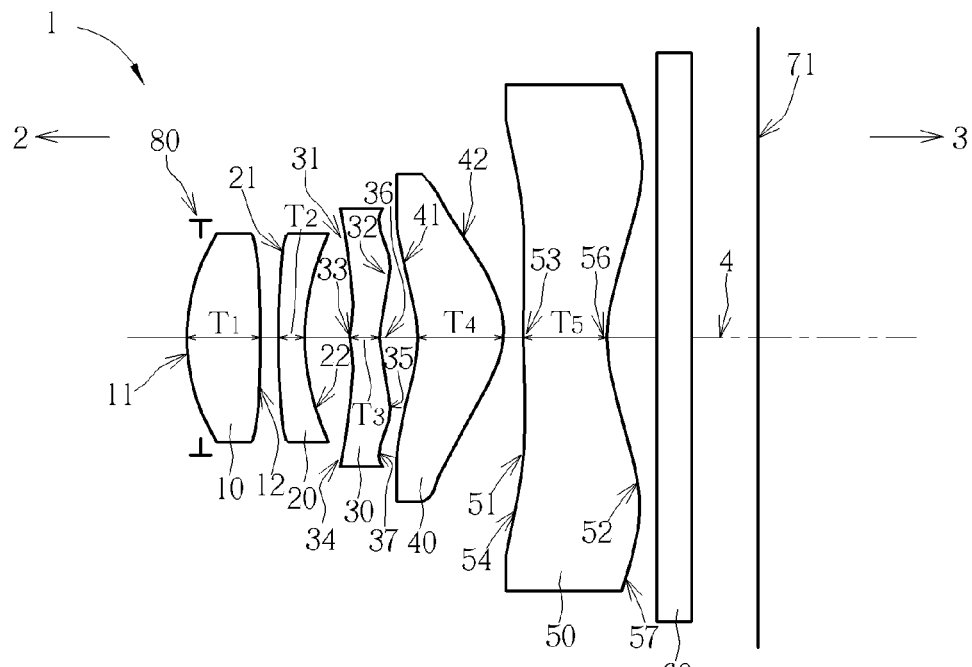
FIG. 7 illustrates a fourth example of the optical imaging lens set of five lens elements of the present invention.
Figures 8A, 8B, 8C, 8D:
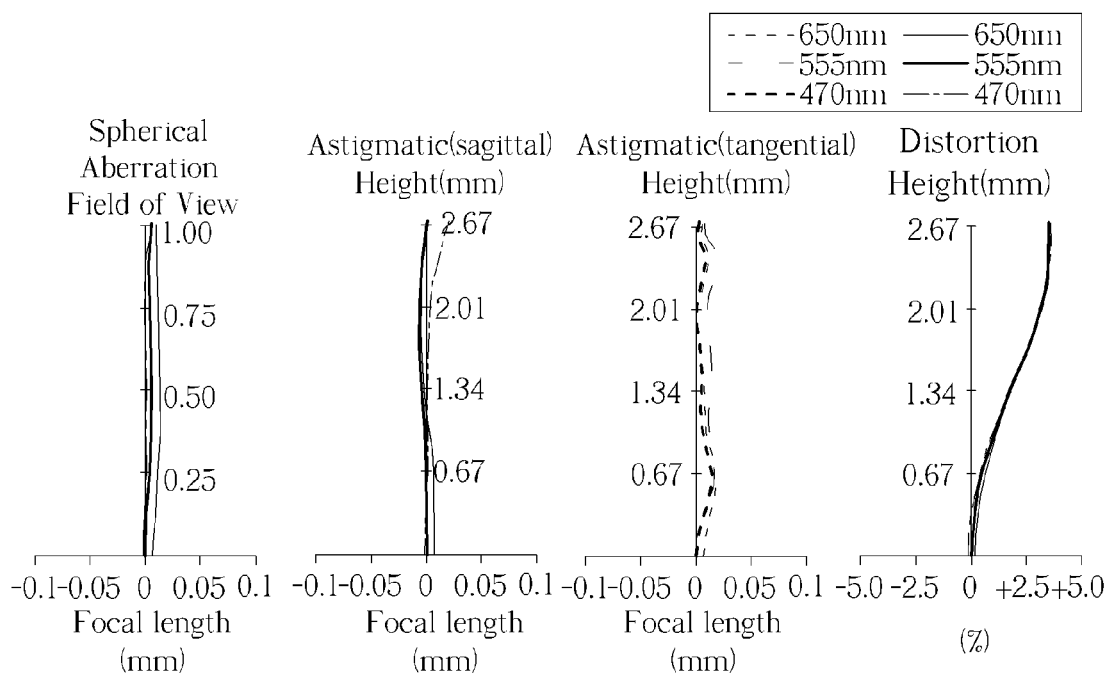
FIG. 8A illustrates the longitudinal spherical aberration on the imaging plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the imaging plane 71 of the first example; please refer to FIG. 8B for the astigmatic aberration on the sagittal direction; please refer to FIG. 8C for the astigmatic aberration on the tangential direction, and please refer to FIG. 8D for the distortion aberration. The fourth example is similar with the first example. The optical data of the fourth example of the optical imaging lens set are shown in FIG. 25 while the aspheric surface data are shown in FIG. 26. The length of the optical imaging lens set is 4.57 mm. Some important ratios of the first example are as follows:

$G_{23}/G_{34}$=1.58
$T_5/G_{aa}$=1.02
$T_4/G_{aa}$=0.94
$T_{al}/L_{tt}$=0.57
$T_{al}/G_{aa}$=3.60
$T_4/T_3$=2.07
$T_5/T_3$=2.24
$T_4/G_{34}$=2.85

Fifth Example

Figure 9:
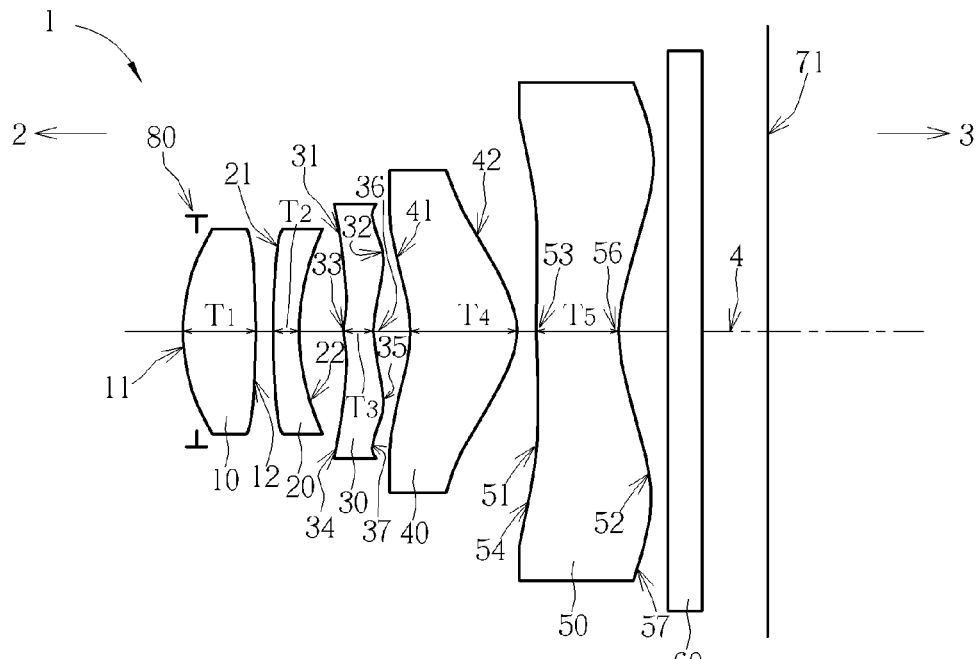
FIG. 9 illustrates a fifth example of the optical imaging lens set of five lens elements of the present invention.
Figures 10A, 10B, 10C, 10D:
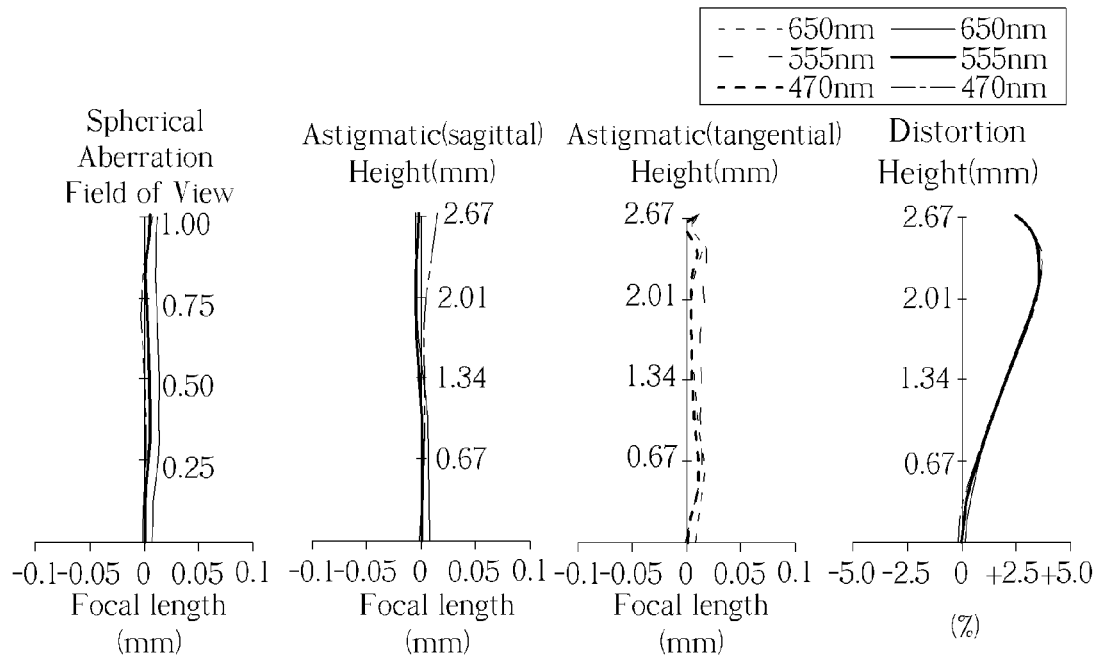
FIG. 10A illustrates the longitudinal spherical aberration on the imaging plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the imaging plane 71 of the first example; please refer to FIG. 10B for the astigmatic aberration on the sagittal direction;

please refer to FIG. 10C for the astigmatic aberration on the tangential direction, and please refer to FIG. 10D for the distortion aberration. The fifth example is similar with the first example. The optical data of the fifth example of the optical imaging lens set 1 are shown in FIG. 27 while the aspheric surface data are shown in FIG. 28. The length of the optical imaging lens set is 4.69 mm. Some important ratios of the first example are as follows:

$G_{23}/G_{34}=1.61$
$T_5/G_{aa}=0.89$
$T_4/G_{aa}=1.18$
$T_{al}/L_{tt}=0.57$
$T_{al}/G_{aa}=3.51$
$T_4/T_3=3.90$
$T_5/T_3=2.96$
$T_4/G_{34}=3.53$

Sixth Example

Figure 11:
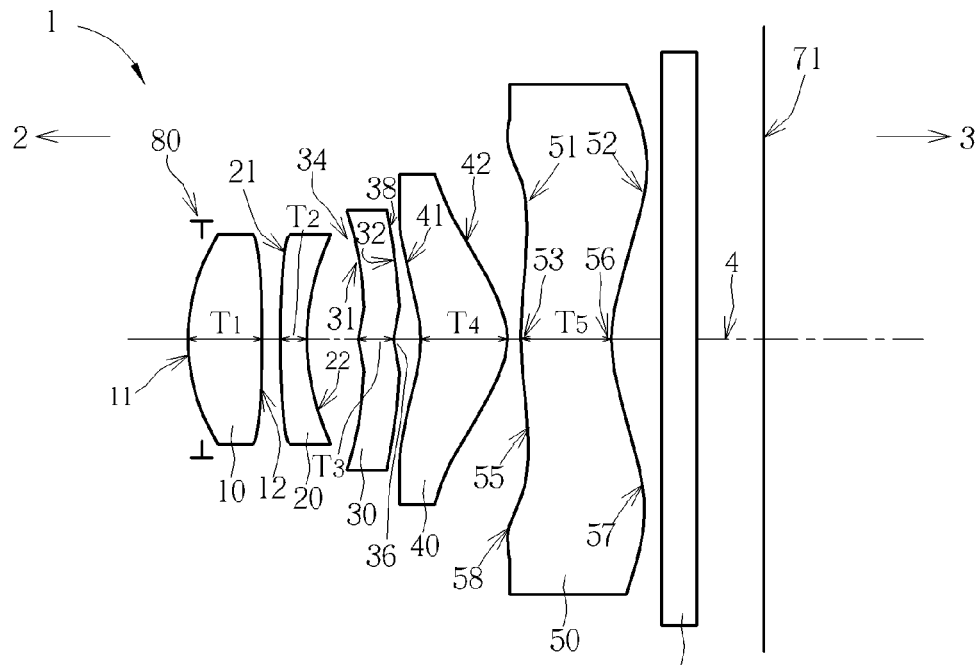
FIG. 11 illustrates a sixth example of the optical imaging lens set of five lens elements of the present invention.
Figures 12A, 12B, 12C, 12D:
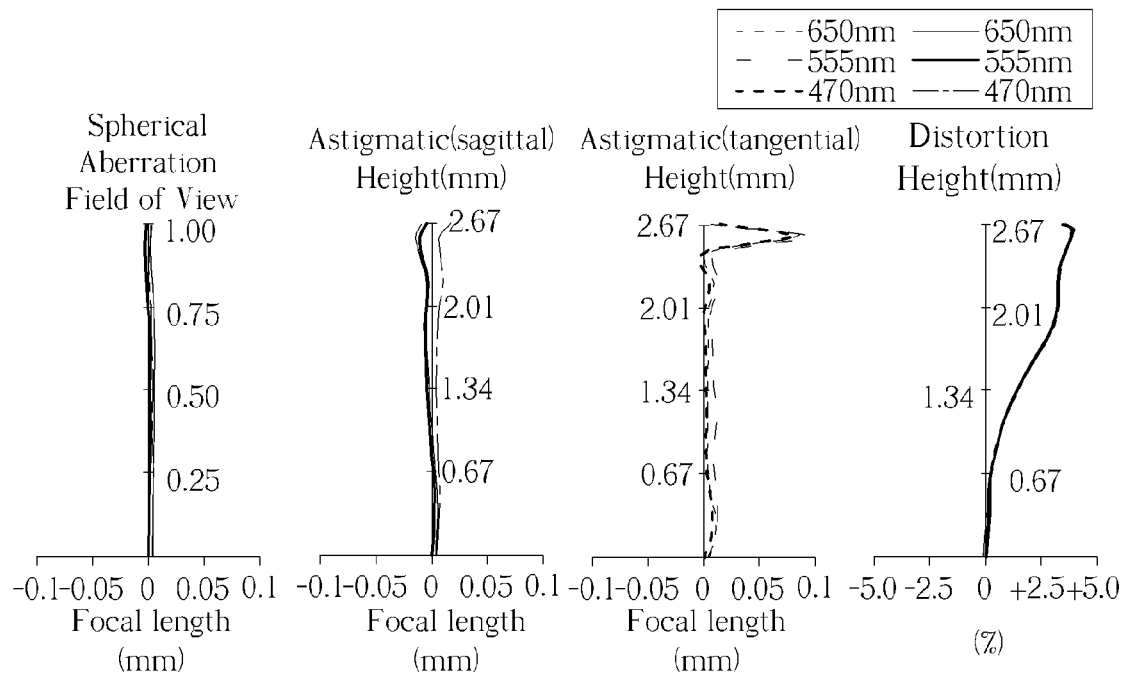
FIG. 12A illustrates the longitudinal spherical aberration on the imaging plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the five-lens elements optical imaging lens set 1 of the present invention. Please refer to FIG. 12A for the longitudinal spherical aberration on the imaging plane 71 of the first example; please refer to FIG. 12B for the astigmatic aberration on the sagittal direction; please refer to FIG. 12C for the astigmatic aberration on the tangential direction, and please refer to FIG. 12D for the distortion aberration. The sixth example is similar with the first example. The differences are that the third lens element 30 has negative refractive power, the third image-side surface 32 has a convex part 38 in a vicinity of its circular periphery; the fifth object-side surface 51 has a convex part 53 in a vicinity of the optical axis 4, a convex part 58 in a vicinity of its circular periphery and a concave part 55 between the optical axis 4 and its circular periphery. The optical data of the sixth example of the optical imaging lens set 1 are shown in FIG. 29 while the aspheric surface data are shown in FIG. 30. The length of the optical imaging lens set is 4.35 mm. Some important ratios of the first example are as follows:

$G_{23}/G_{34}=2.08$
$T_5/G_{aa}=0.50$
$T_4/G_{aa}=0.58$
$T_{al}/L_{tt}=0.54$
$T_{al}/G_{aa}=2.23$
$T_4/T_3=2.00$
$T_5/T_3=1.72$
$T_4/G_{34}=2.85$

Seventh Example

Figure 13:
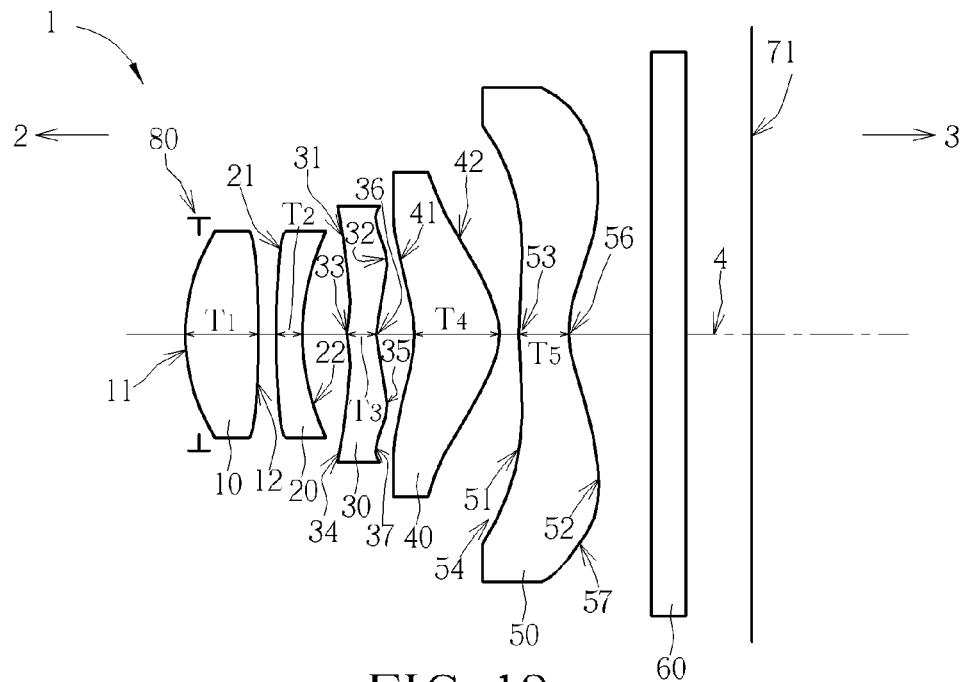
FIG. 13 illustrates a seventh example of the optical imaging lens set of five lens elements of the present invention.
Figures 14A, 14B, 14C, 14D:
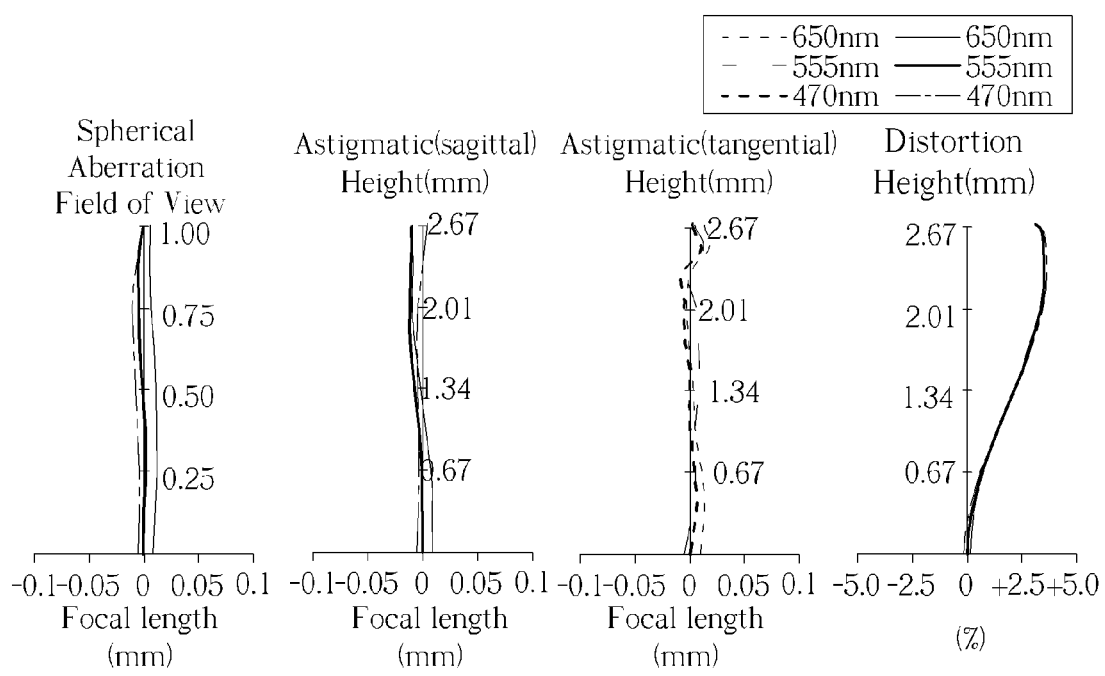
FIG. 14A illustrates the longitudinal spherical aberration on the imaging plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the imaging plane 71 of the first example; please refer to FIG. 14B for the astigmatic aberration on the sagittal direction; please refer to FIG. 14C for the astigmatic aberration on the tangential direction, and please refer to FIG. 14D for the distortion aberration. The seventh example is similar with the first example. The optical data of the seventh example of the optical imaging lens set 1 are shown in FIG. 31 while the aspheric surface data are shown in FIG. 32. The length of the optical imaging lens set is 4.55 mm. Some important ratios of the first example are as follows:

$G_{23}/G_{34}=2.25$
$T_5/G_{aa}=0.52$
$T_4/G_{aa}=1.01$
$T_{al}/L_{tt}=0.53$
$T_{al}/G_{aa}=2.81$
$T_4/T_3=3.90$
$T_5/T_3=2.01$
$T_4/G_{34}=4.61$

Some important ratios in each example are shown in FIG. 33.

In each one of the above examples, the Y-axis of the longitudinal spherical aberration are normalized HFOV. It is observed from all the longitudinal spherical aberration, the astigmatic aberration, the astigmatic aberration and the distortion aberration that the focal lengths for the three different wave lengths within the entire field of view are pretty close to the imaging plane 71 (FIG. 2A for example), and the deviations with respect to the imaging plane 71 are extremely low (FIGS. 2B and 2C for example), which shows that each example of the present invention is able to maintain a better imaging quality even though a larger field of view is involved.

In the light of the above examples, the inventor discovers that there are some better ratio ranges for different parameters according to the above various important ratios. For example:

1. $G_{23}$ and $G_{34}$ should satisfy $1.40 \leq G_{23}/G_{34}$ considering a suitable incident height of light entering the third and fourth lens element, and feasibility for assembly to render a preferred configuration in the process of shortening the optical imaging lens set. It is preferably $1.40 \leq G_{23}/G_{34} \leq 15$ and more preferably, $1.40 \leq G_{23}/G_{34} \leq 12$.

Figure 15:
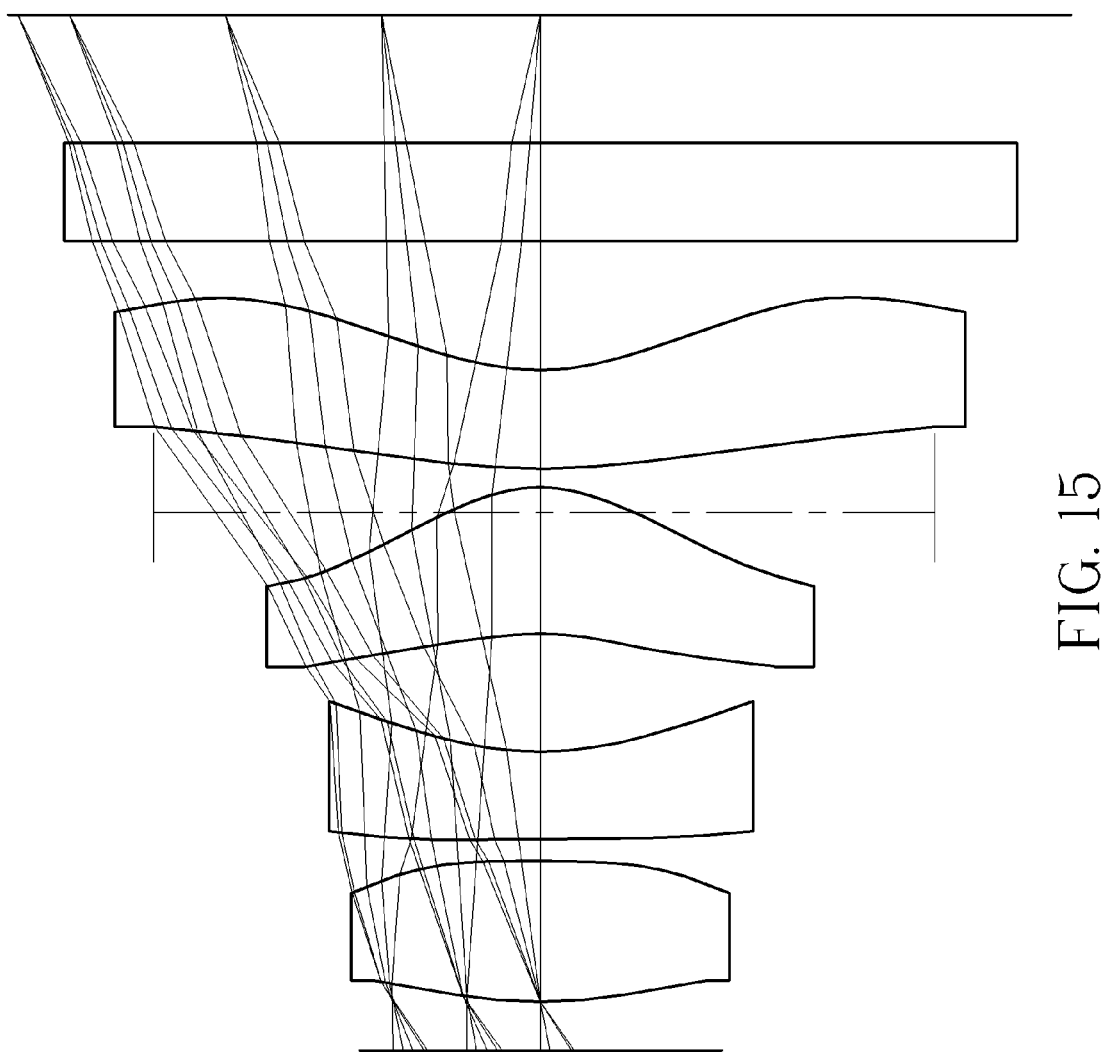
FIG. 15 illustrates an optical imaging lens set of four lens elements.

2. $G_{aa}$ and $T_5$ should satisfy $0.5 \leq T_5/G_{aa}$ considering: a) a thicker lens element makes it easier to fabricate since the fifth lens element 50 is typically the lens element of the relatively larger optical effective aperture; b) a smaller $G_{aa}$ helps shorten the optical imaging lens set. It is preferably $0.5 \leq T_5/G_{aa} \leq 1.5$ and more preferably $0.5 \leq T_5/G_{aa} \leq 1.2$. FIG. 15 illustrates an optical imaging lens set of four lens elements. The possible largest range (as shown in dotted lines) which the light can pass through from the fourth object-side surface is the optical effective aperture of the fourth object-side surface.

3. $T_4$ and $G_{aa}$ should satisfy $0.53 \leq T_4/G_{aa}$ when $T_4$ and $G_{aa}$ are suitably configured. The fourth lens element 40 also has larger optical effective aperture in the optical imaging lens set. A thicker lens element makes it easier to fabricate and a smaller $G_{aa}$ helps shorten the optical imaging lens set. It is preferably $0.53 \leq T_4/G_{aa} \leq 1.73$ and more preferably the range of $0.53 \leq T_4/G_{aa} \leq 1.35$.

4. A larger $T_{al}/L_{tt}$ represents that $L_{tt}$ reduces more than $T_{al}$ does. When the optical imaging lens set shortens, not only $T_{al}$ but also $G_{aa}$ and the back focal length (BFL for short, referring to the fifth image-side surface 52 to the imaging plane 71 along the optical axis 4) as well may be smaller. Considering the shortening of the optical imaging lens set and fabricating feasibility, $T_{al}$ should be neither too thick nor too thin. $L_{tt}$ and $T_{al}$ should satisfy $0.55 \leq T_{al}/L_{tt}$. It is preferably $0.55 \leq T_{al}/L_{tt} \leq 0.65$ and more preferably $0.55 \leq T_{al}/L_{tt} \leq 0.60$.

5. The design of $T_{al}$ should take both shortening of the optical imaging lens set and fabricating feasibility into consideration, and the design of $G_{aa}$ should take both the height of the incident light and the edge interference between the lens elements into consideration. $T_{al}$ and $G_{aa}$ should satisfy $2.8 \leq T_{al}/G_{aa}$ to make both the lens element thickness and the total air gaps better configured. It is preferably $2.8 \leq T_{al}/G_{aa} \leq 7$ and more preferably $2.8 \leq T_{al}/G_{aa} \leq 4.5$.

6. The fourth lens element 40 has a larger optical effective aperture while the third lens element 30 has a smaller one in the optical imaging lens set. Considering the fabricating feasibility, $T_3$ shortens more than $T_4$ does, thus $T_3$ and $T_4$ should satisfy $2 \leq T_4/T_3$. It is preferably $2 \leq T_4/T_3 \leq 6$ and more preferably $2 \leq T_4/T_3 \leq 4.3$.

7. The fifth lens element 50 has a larger optical effective aperture while the third lens element 30 has a smaller one in the optical imaging lens set. Considering the fabricating feasibility, $T_3$ shortens more than $T_5$ does, thus $T_3$ and $T_5$ satisfy $2 \leq T_5/T_3$. It is preferably $2 \leq T_5/T_3 \leq 4$ and more preferably $2 \leq T_5/T_3 \leq 3.3$.

8. The fourth lens element 40 has a larger optical effective aperture in the optical imaging lens set so a thicker lens element makes the lens set easier to fabricate, while $G_{34}$ is involved with the height of light entering the fourth lens element 40 and fabricating feasibility, and should be neither too large nor too small. $T_4$ and $G_{34}$ should satisfy $2.85 \leq T_4/G_{34}$ to obtain a better configuration in the process of lens set shortening. If the design satisfies 2.85 $T_4/G_{34}$, it may obtain a better configuration in the process of shortening the lens set. It is preferably $2.85 \leq T_4/G_{34} \leq 15$ and more preferably $2.85 \leq T_4/G_{34} \leq 13$.

Figure 16:
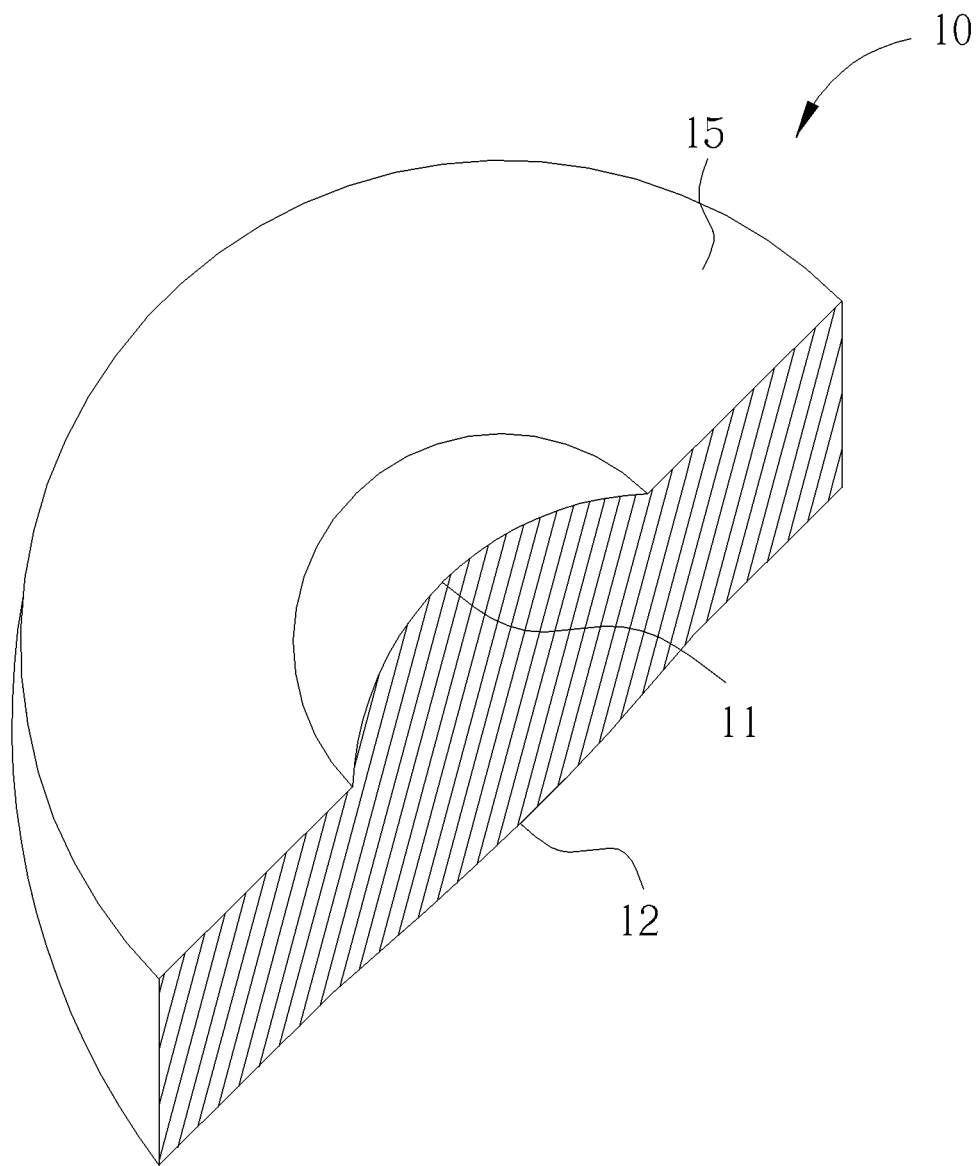
FIG. 16 shows an anchoring part.

In another aspect of the present invention, in order to simplify the illustrations of the structure of each lens element, for example in FIG. 1, only the regions which the imaging light passes through are shown. Take the first lens element 10 for example, as shown in FIG. 1, only the first object-side surface 11 facing toward the object side 2 and the first image-side surface 12 facing toward the image side 3 are illustrated. However, in addition to each lens element in the first example to the seventh example, an optional anchoring part may be additionally introduced for each lens element to be disposed in the optical imaging lens set 1. Similarly take the first lens element 10 for example, as shown in FIG. 16, FIG. 16 shows the first lens element 10 along with an anchoring part. The anchoring part shown in FIG. 16 is the extension part 15 which is extended outwardly by both the first object-side surface 11 and the first image-side surface 12 for the first lens element 10 to be disposed in the optical imaging lens set 1. Ideally speaking, no light would pass through the extension part 15. FIG. 16 merely illustrates a possible implementation of the anchoring part to practice the optical imaging lens set 1. In other words, the actual structure and shape of the anchoring part is not limited to this and may have other variations.

Figure 17:
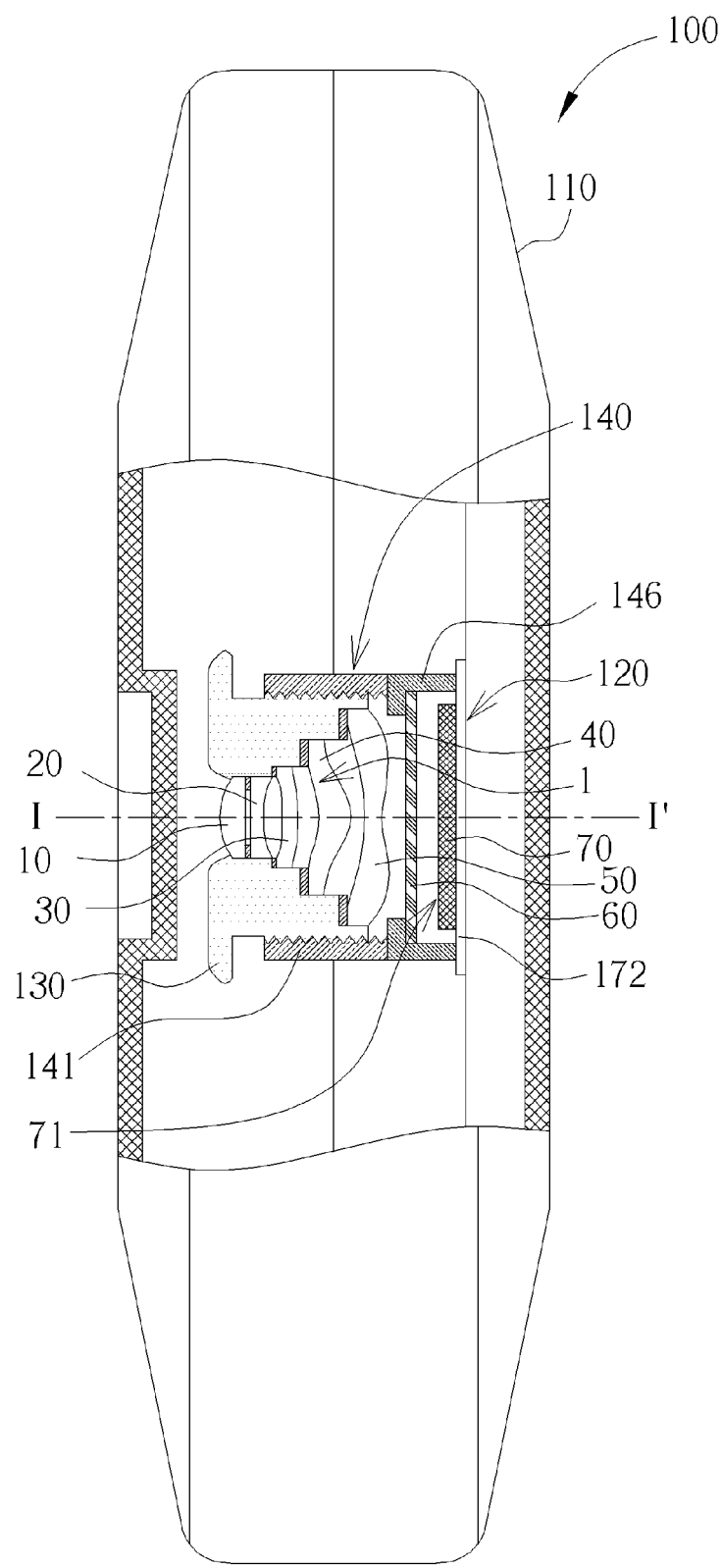
FIG. 17 illustrates a first preferred example of the optical imaging lens set of the present invention for use in a portable electronic device.

The optical imaging lens set 1 of the present invention may be applied to a portable electronic device. Please refer to FIG. 17. FIG. 17 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 17 as an example, but the portable electronic device 100 is not limited to a mobile phone.

As shown in FIG. 17, the image module 120 includes the optical imaging lens set 1 as described above. FIG. 17 illustrates the aforementioned first example of the optical imaging lens set 1. In addition, the portable electronic device 100 also contains a barrel 130 for the installation of the optical imaging lens set 1, a module housing unit 140 for the installation of the barrel 130, and an image sensor 70 disposed at the image side 3 of the optical imaging lens set 1. The image sensor 70 in the optical imaging lens set 1 may be an electronic photosensitive element, such as a charge coupled device or a complementary metal oxide semiconductor element. The imaging plane 71 forms at the image sensor 70.

To be noticed in particular, the image sensor 70 used here is a product of chip on board (COB) package rather than a product of the conventional chip scale package (CSP) so protective glass is not needed. In other words, there is no protective glass in the entire optical imaging lens set 1.

It should be noted that the optional filter 60 may be omitted although the optional filter 60 is present in this example. The case 110, the barrel 130, and/or the module housing unit 140 may be a single element or consist of a plurality of elements, but the present invention is not limited to this. Secondly, the image sensor 70 used in the example is directly connected to a substrate 172 by means of a chip on board (COB) package rather than by means of the conventional chip scale package (CSP) so protective glass is omitted. The difference is that the chip on board (COB) package does not require the use of protective glass. Therefore, there is no protective glass disposed in front of the image sensor 70 in the optical imaging lens set 1 but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens backseat 141, and an image sensor base 146 installed between the lens backseat 141 and the image sensor 70. However in other examples, the image sensor base 146 is optional. The barrel 130 is installed coaxially along with the lens backseat 141 along the axis I-I', and the barrel 130 is provided inside of the lens backseat 141.

Because the optical imaging lens set 1 of the present invention may be as short as 4.61 mm, this ideal length allows the dimensions and the size of the portable electronic device 100 to be smaller and lighter, but a good optical performance and an image quality remain. In such a way, the various examples of the present invention satisfy the need for economic benefits of using less raw materials in addition to satisfy the trend for a smaller and lighter product design and consumers' demands.

Figure 18:
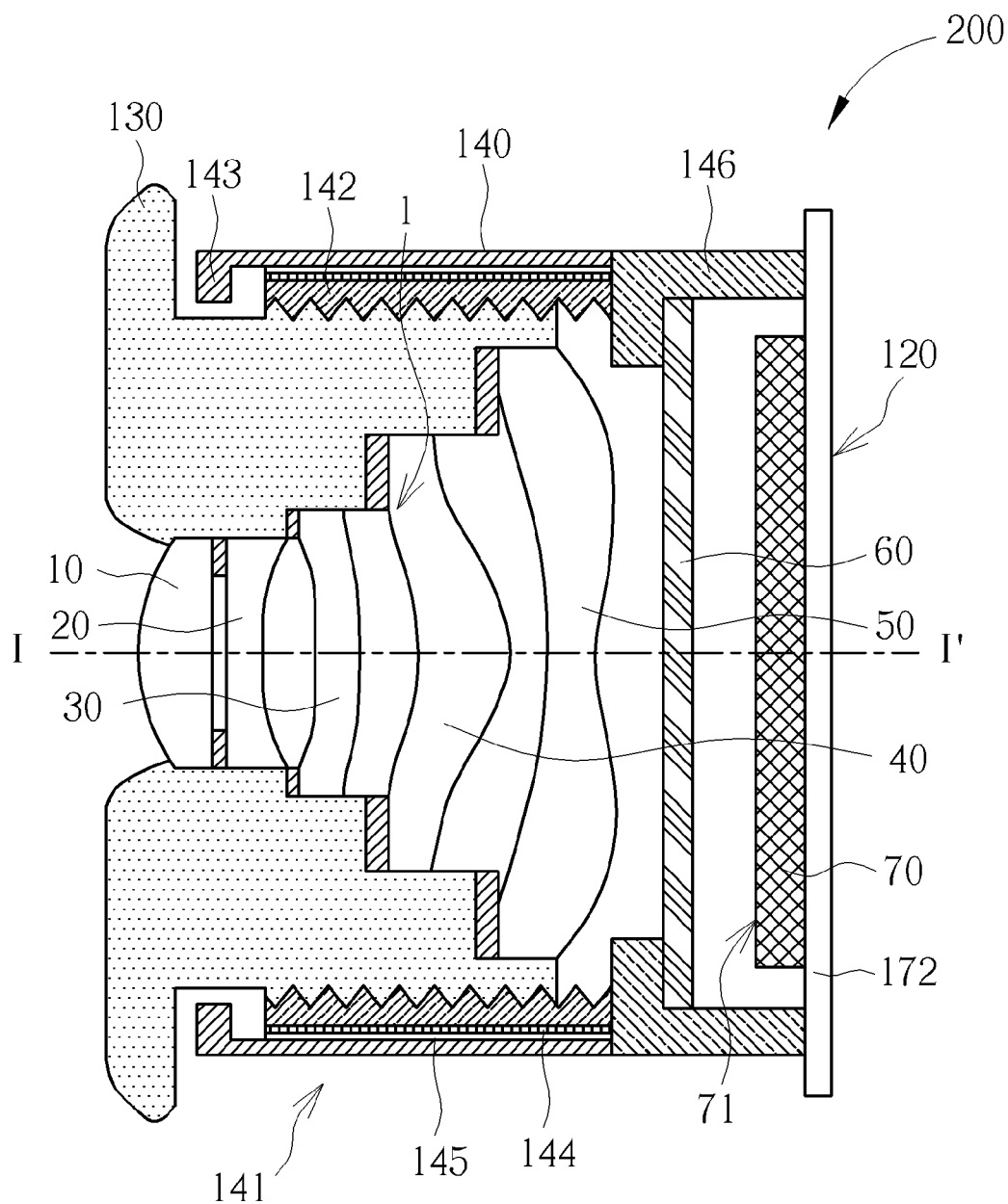
FIG. 18 illustrates a second preferred example of the optical imaging lens set for use in another portable electronic device.

Please also refer to FIG. 18 for another application of the aforementioned optical imaging lens set 1 in a portable electronic device 200 in the second preferred example. The main differences between the portable electronic device 200 in the second preferred example and the portable electronic device 100 in the first preferred example are: the lens element backseat 141 has a first seat element 142, a second seat element 143, a coil 144 and a magnetic component 145. The first seat element 142 is for the installation of the barrel 130 and disposed along the axis I-I'. The second seat element 143 is disposed along the axis I-I' and surround the first seat element 142. The coil 144 is provided between the outside of the first seat element 142 and the inside of the second seat element 143. The magnetic component 145 is disposed between the outside of the coil 144 and the inside of the second seat element 143.

The first seat element 142, the barrel 130 and the optical imaging lens set 1 which is disposed inside of the barrel 130 can be movable together with respect to said image sensor along the optical axis 4. The image sensor base 146 is attached to the second seat element 143. The filter 60, such as an infrared filter, is installed at the image sensor base 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising:
   a first lens element with positive refractive power, having a first image-side surface facing toward said image side and said first image-side surface having a convex part in a vicinity of a circular periphery of said first lens element;

a second lens element having a second object-side surface facing toward said object side and said second object-side surface having a convex part in a vicinity of a circular periphery of said second lens element;

a third lens element having a third object-side surface facing toward said object side and said third object-side surface having a concave part in a vicinity of a circular periphery of said third lens element;

a fourth lens element having a fourth object-side surface facing toward said object side and said fourth object-side surface being a concave surface; and a plastic fifth lens element having a fifth image-side surface facing toward said image side and said fifth image-side surface having a concave part in a vicinity of said optical axis, wherein said optical imaging lens set exclusively has five lens elements with refractive power, comprises an air gap with a thickness $G_{23}$ and between said second lens element and said third lens element along said optical axis as well as an air gap with a thickness $G_{34}$ and between said third lens element and said fourth lens element along said optical axis, and satisfies a relationship $1.40 \leq G_{23}/G_{34}$.

2. The optical imaging lens set of claim 1, wherein total four air gaps with a total thickness $G_{aa}$ between said first lens element and said fifth lens element along said optical axis and a thickness $T_5$ of said fifth lens element along said optical axis satisfy a relationship $0.50 \leq T_5/G_{aa}$.

3. The optical imaging lens set of claim 2, wherein a total thickness $T_{al}$ of said first lens element, said second lens element, said third lens element, said fourth lens element and said fifth lens element along said optical axis, and a distance $L_{tt}$ from said first object-side surface to an imaging plane on said image side along said optical axis satisfy a relationship $0.55 \leq T_{al}/L_{tt}$.

4. The optical imaging lens set of claim 3, wherein a thickness $T_3$ of said third lens element along said optical axis satisfies a relationship $2 \leq T_5/T_3$.

5. The optical imaging lens set of claim 2, wherein a thickness $T_4$ of said fourth lens element along said optical axis satisfies a relationship $0.53 \leq T_4/G_{aa}$.

6. The optical imaging lens set of claim 5, wherein a total thickness $T_{al}$ of said first lens element, said second lens element, said third lens element, said fourth lens element and said fifth lens element along said optical axis, and a distance $L_{tt}$ from said first object-side surface to an imaging plane on said image side along said optical axis satisfy a relationship $0.55 \leq T_{al}/L_{tt}$.

7. The optical imaging lens set of claim 2, wherein a thickness $T_3$ of said third lens element along said optical axis and a thickness $T_4$ of said fourth lens element along said optical axis satisfy a relationship $2 \leq T_4/T_3$.

8. The optical imaging lens set of claim 7, wherein a total thickness $T_{al}$ of said first lens element, said second lens element, said third lens element, said fourth lens element and said fifth lens element along said optical axis, and a distance $L_{tt}$ from said first object-side surface to an imaging plane on said image side along said optical axis satisfy a relationship $0.55 \leq T_{al}/L_{tt}$.

9. The optical imaging lens set of claim 1, wherein total four air gaps with a total thickness $G_{aa}$ between said first lens element and said fifth lens element along said optical axis and a thickness $T_4$ of said fourth lens element along said optical axis satisfy a relationship $0.53 \leq T_4/G_{aa}$.

10. The optical imaging lens set of claim 9, wherein a total thickness $T_{al}$ of said first lens element, said second lens element, said third lens element, said fourth lens element and said fifth lens element along said optical axis, and a distance $L_{tt}$ from said first object-side surface to an imaging plane on said image side along said optical axis satisfy a relationship $0.55 \leq T_{al}/L_{tt}$.

11. The optical imaging lens set of claim 1, wherein a thickness $T_3$ of said third lens element along said optical axis and a thickness $T_4$ of said fourth lens element along said optical axis satisfy a relationship $2 \leq T_4/T_3$.

12. The optical imaging lens set of claim 11, wherein a thickness $T_3$ of said third lens element along said optical axis and a thickness $T_5$ of said fifth lens element along said optical axis satisfy a relationship $2 \leq T_5/T_3$.

13. The optical imaging lens set of claim 12, wherein a total thickness $T_{al}$ of said first lens element, said second lens element, said third lens element, said fourth lens element and said fifth lens element along said optical axis, and total four air gaps with a total thickness $G_{aa}$ between said first lens element and said fifth lens element along said optical axis satisfy a relationship $2.8 \leq T_{al}/G_{aa}$.

14. The optical imaging lens set of claim 1, wherein a thickness $T_4$ of said fourth lens element along said optical axis satisfies a relationship $2.85 \leq T_4/G_{34}$.

15. The optical imaging lens set of claim 14, wherein a thickness $T_3$ of said third lens element along said optical axis and a thickness $T_5$ of said fifth lens element along said optical axis satisfy a relationship $2 \leq T_5/T_3$.

16. An electronic device, comprising:
a case; and
an image module disposed in said case and comprising:
an optical imaging lens set of claim 1;
a barrel for the installation of said optical imaging lens set;
a module housing unit for the installation of said barrel; and
an image sensor disposed at an image side of said optical imaging lens set.

17. The electronic device of claim 16, wherein said module housing unit has a lens backseat with a first seat element for the installation of said barrel and disposed along an axis as well as a second seat element disposed along said axis and surround said first seat element so that said first seat element, said barrel, and said imaging lens set can be movable together with respect to said image sensor along said optical axis.

18. The electronic device of claim 17, wherein said module housing unit further comprises an image sensor base which is disposed between said second seat element and said image sensor to be attached to said second seat element.

* * * * *